US012399820B1

United States Patent
Österlund et al.

(10) Patent No.: US 12,399,820 B1
(45) Date of Patent: Aug. 26, 2025

(54) SELECTING GARBAGE COLLECTION PROCESSES

(71) Applicant: Oracle International Corporation, Redwood Shores, CA (US)

(72) Inventors: Erik Österlund, Vasterhaninge (SE); Axel Boldt-Christmas, Stockholm (SE); Stefan Mats Rikard Karlsson, Nacka (SE)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/584,787

(22) Filed: Feb. 22, 2024

(51) Int. Cl.
    *G06F 12/02* (2006.01)

(52) U.S. Cl.
    CPC .. *G06F 12/0253* (2013.01); *G06F 2212/1044* (2013.01); *G06F 2212/7205* (2013.01)

(58) Field of Classification Search
    CPC ......... G06F 12/0253; G06F 2212/1044; G06F 12/0269; G06F 12/023; G06F 2212/70; G06F 9/4488; G06F 2212/151; G06F 2212/152; G06F 2212/7205
    USPC ................................ 711/165, E12.009, 170
    See application file for complete search history.

(56) References Cited

U.S. PATENT DOCUMENTS

| 5,765,007 | A | 6/1998 | Rahman et al. |
| 5,787,430 | A | 7/1998 | Doeringer et al. |
| 5,842,016 | A | 11/1998 | Toutonghi et al. |
| 5,873,104 | A | 2/1999 | Tremblay et al. |
| 5,928,357 | A | 7/1999 | Underwood et al. |
| 5,933,840 | A | 8/1999 | Menon et al. |
| 6,052,699 | A | 4/2000 | Huelsbergen et al. |

(Continued)

FOREIGN PATENT DOCUMENTS

| CA | 2700217 C | 7/2011 |
| CN | 117539478 A | 2/2024 |

(Continued)

OTHER PUBLICATIONS

Geeksforgeeks, "Thread in Operating System", Aug. 16, 2019, pp. 1-4, https://web.archive.org/web/20200926013500/https://www.geeksforgeeks.org/thread-in-operating-system/ (Year: 2019).

(Continued)

*Primary Examiner* — Hashem Farrokh
(74) *Attorney, Agent, or Firm* — Invoke

(57) ABSTRACT

A system executes a first virtual thread, including storing a first shared object in a first private memory region, storing a pointer in a shared memory region, and determining that the pointer includes a reference to a location of the first shared object in the first private memory region. Responsive to determining that the pointer includes the reference, the system designates the first virtual thread as disqualified from eligibility for execution of a sweeping thread-local garbage collection process and augments the pointer to indicate that the pointer includes the reference to the location of the first shared object. The system executes a second virtual thread, including loading the pointer and determining that the pointer has been augmented. Responsive to determining that the pointer has been augmented, the system designates the second virtual thread as disqualified from eligibility for execution of the sweeping thread-local garbage collection process.

20 Claims, 8 Drawing Sheets

(56) References Cited

U.S. PATENT DOCUMENTS

| | | |
|---|---|---|
| 6,065,020 A | 5/2000 | Dussud |
| 6,158,024 A | 12/2000 | Mandal |
| 6,226,653 B1 | 5/2001 | Alpern et al. |
| 6,304,949 B1 | 10/2001 | Houlsdworth |
| 6,324,637 B1 | 11/2001 | Hamilton |
| 6,499,032 B1 | 12/2002 | Tikkanen et al. |
| 6,567,905 B2 | 5/2003 | Otis |
| 6,694,346 B1 | 2/2004 | Aman et al. |
| 6,728,732 B1 | 4/2004 | Eatherton et al. |
| 6,766,513 B2 | 7/2004 | Charnell et al. |
| 6,769,004 B2 | 7/2004 | Barrett |
| 6,809,792 B1 | 10/2004 | Tehranchi et al. |
| 6,915,296 B2 | 7/2005 | Parson |
| 7,072,905 B2 | 7/2006 | Garthwaite |
| 7,089,272 B1 | 8/2006 | Garthwaite et al. |
| 7,269,705 B1 | 9/2007 | Seidl et al. |
| 7,293,051 B1 | 11/2007 | Printezis et al. |
| 7,389,395 B1 | 6/2008 | Garthwaite et al. |
| 7,404,182 B1 | 7/2008 | Garthwaite et al. |
| 7,523,081 B1 | 4/2009 | Engebretsen |
| 7,539,837 B1 | 5/2009 | Flood et al. |
| 7,546,587 B2 | 6/2009 | Marr et al. |
| 7,548,940 B2 | 6/2009 | Bacon et al. |
| 7,610,437 B2 | 10/2009 | Sinclair et al. |
| 7,774,389 B2 | 8/2010 | Stephens et al. |
| 7,808,929 B2 | 10/2010 | Wong et al. |
| 7,904,493 B2 | 3/2011 | Schmelter et al. |
| 7,962,707 B2 | 6/2011 | Kaakani et al. |
| 7,984,084 B2 | 7/2011 | Sinclair |
| 8,051,426 B2 | 11/2011 | Meijer et al. |
| 8,261,269 B2 | 9/2012 | Garmark |
| 8,285,918 B2 | 10/2012 | Maheshwari |
| 8,381,094 B1 | 2/2013 | Prasad et al. |
| 8,429,526 B2 | 4/2013 | Sthanikam et al. |
| 8,443,263 B2 | 5/2013 | Selinger et al. |
| 8,495,093 B2 | 7/2013 | Baudel |
| 8,499,283 B2 | 7/2013 | Mony |
| 8,539,338 B2 | 9/2013 | Zhu et al. |
| 8,655,913 B1 | 2/2014 | Shah et al. |
| 8,688,754 B1 | 4/2014 | Burka et al. |
| 8,788,778 B1 | 7/2014 | Boyle |
| 8,825,719 B2 | 9/2014 | Steensgaard et al. |
| 8,825,721 B2 | 9/2014 | Hunt et al. |
| 8,856,186 B1 | 10/2014 | Li et al. |
| 8,873,284 B1 | 10/2014 | Sinclair et al. |
| 9,135,169 B2 | 9/2015 | Kawachiya et al. |
| 9,171,097 B2 | 10/2015 | Ceze et al. |
| 9,208,081 B1 | 12/2015 | Dice et al. |
| 9,223,693 B2 | 12/2015 | Sinclair et al. |
| 9,268,763 B1 | 2/2016 | Esho et al. |
| 9,305,169 B2 | 4/2016 | Borohovski et al. |
| 9,323,608 B2 | 4/2016 | Troia |
| 9,330,191 B2 | 5/2016 | Teevan et al. |
| 9,330,395 B2 | 5/2016 | Hauser |
| 9,336,133 B2 | 5/2016 | Sinclair et al. |
| 9,338,143 B2 | 5/2016 | Hansen et al. |
| 9,348,746 B2 | 5/2016 | Sinclair et al. |
| 9,386,037 B1 | 7/2016 | Hunt et al. |
| 9,465,731 B2 | 10/2016 | Sinclair et al. |
| 9,503,435 B2 | 11/2016 | Mizrahi et al. |
| 9,578,048 B1 | 2/2017 | Hunt et al. |
| 9,652,382 B1 | 5/2017 | Subramanian et al. |
| 9,727,456 B2 | 8/2017 | Malwankar et al. |
| 9,734,050 B2 | 8/2017 | Sinclair et al. |
| 9,734,911 B2 | 8/2017 | Sinclair et al. |
| 9,740,716 B2 | 8/2017 | Wilhelmsson |
| 9,778,855 B2 | 10/2017 | Sinclair |
| 9,953,014 B1 | 4/2018 | Reshadi et al. |
| 9,971,683 B1 | 5/2018 | Bell et al. |
| 10,002,074 B2 | 6/2018 | Flood et al. |
| 10,084,779 B2 | 9/2018 | Hunt et al. |
| 10,108,543 B1 | 10/2018 | Duggal et al. |
| 10,108,544 B1 | 10/2018 | Duggal et al. |
| 10,120,613 B2 | 11/2018 | Sinclair et al. |
| 10,127,210 B1 | 11/2018 | Karppanen |
| 10,133,490 B2 | 11/2018 | Sinclair et al. |
| 10,146,749 B2 | 12/2018 | Ayoub et al. |
| 10,146,752 B2 | 12/2018 | Ciabarra et al. |
| 10,255,179 B2 | 4/2019 | Ji et al. |
| 10,261,898 B1 | 4/2019 | Payer |
| 10,318,592 B2 | 6/2019 | Ciabarra et al. |
| 10,346,520 B2 | 7/2019 | Hunt et al. |
| 10,419,568 B2 | 9/2019 | Rubtsov et al. |
| 10,430,279 B1 | 10/2019 | Dittia et al. |
| 10,452,758 B1 | 10/2019 | Bhowmick |
| 10,547,679 B1 | 1/2020 | Burnett et al. |
| 10,664,391 B2 | 5/2020 | Jang |
| 10,726,091 B2 | 7/2020 | Isager |
| 10,739,996 B1 | 8/2020 | Ebsen et al. |
| 10,757,101 B2 | 8/2020 | Hunt et al. |
| 10,795,812 B1 | 10/2020 | Duggal et al. |
| 10,908,930 B2 | 2/2021 | Yeh |
| 10,929,288 B1 | 2/2021 | Moore et al. |
| 10,969,959 B2 | 4/2021 | Somasundaram et al. |
| 10,983,715 B2 | 4/2021 | Sharoni et al. |
| 10,983,908 B1 | 4/2021 | Zou et al. |
| 10,986,182 B1 | 4/2021 | Burnett et al. |
| 10,996,884 B2 | 5/2021 | Danilov et al. |
| 11,050,811 B2 | 6/2021 | Mashaal et al. |
| 11,086,537 B2 | 8/2021 | Byun |
| 11,157,680 B1 | 10/2021 | Lee et al. |
| 11,165,822 B2 | 11/2021 | Hunt et al. |
| 11,194,885 B1 | 12/2021 | Parhami et al. |
| 11,201,892 B1 | 12/2021 | Kashitsyn et al. |
| 11,222,091 B2 | 1/2022 | Liu et al. |
| 11,228,611 B1 | 1/2022 | John et al. |
| 11,301,539 B2 | 4/2022 | Macxis et al. |
| 11,366,801 B1 | 6/2022 | Kumar et al. |
| 11,397,843 B1 | 7/2022 | Lee et al. |
| 11,507,503 B1 | 11/2022 | Sterlund et al. |
| 11,561,962 B2 | 1/2023 | Abdoun et al. |
| 11,573,894 B2 | 2/2023 | Österlund et al. |
| 11,601,460 B1 | 3/2023 | Hunt |
| 2002/0059520 A1 | 5/2002 | Murakami et al. |
| 2003/0005027 A1 | 1/2003 | Borman et al. |
| 2003/0188141 A1 | 10/2003 | Chaudhry et al. |
| 2004/0024812 A1 | 2/2004 | Park et al. |
| 2004/0186863 A1 | 9/2004 | Garthwaite |
| 2004/0187102 A1 | 9/2004 | Garthwaite |
| 2005/0066329 A1 | 3/2005 | Fischer et al. |
| 2005/0081190 A1 | 4/2005 | Betancourt et al. |
| 2005/0102670 A1 | 5/2005 | Bretl et al. |
| 2005/0114844 A1 | 5/2005 | Betancourt et al. |
| 2005/0149686 A1 | 7/2005 | Bacon et al. |
| 2005/0160413 A1* | 7/2005 | Broussard .............. G06F 9/5072 |
| | | 717/148 |
| 2005/0160416 A1 | 7/2005 | Jamison |
| 2005/0188164 A1 | 8/2005 | Ballantyne et al. |
| 2005/0235006 A1 | 10/2005 | Adl-Tabatabai et al. |
| 2005/0267996 A1 | 12/2005 | O'Connor et al. |
| 2006/0005171 A1 | 1/2006 | Ellison |
| 2006/0026379 A1 | 2/2006 | Jung |
| 2006/0143168 A1 | 6/2006 | Rossmann |
| 2006/0143395 A1 | 6/2006 | Zohar et al. |
| 2007/0016633 A1 | 1/2007 | Lindholm et al. |
| 2007/0022149 A1 | 1/2007 | Bacon et al. |
| 2007/0033325 A1 | 2/2007 | Sinclair |
| 2007/0162528 A1 | 7/2007 | Wright et al. |
| 2007/0203960 A1 | 8/2007 | Guo |
| 2007/0234005 A1 | 10/2007 | Erlingsson et al. |
| 2007/0240035 A1 | 10/2007 | Sthanikam et al. |
| 2008/0034175 A1 | 2/2008 | Traister et al. |
| 2008/0082596 A1 | 4/2008 | Gorobets |
| 2008/0086619 A1 | 4/2008 | Traister et al. |
| 2008/0140737 A1 | 6/2008 | Garst et al. |
| 2008/0162787 A1 | 7/2008 | Tomlin et al. |
| 2008/0189477 A1 | 8/2008 | Asano et al. |
| 2008/0250213 A1 | 10/2008 | Holt |
| 2009/0007075 A1 | 1/2009 | Edmark et al. |
| 2009/0037660 A1 | 2/2009 | Fairhurst |
| 2009/0119352 A1 | 5/2009 | Branda et al. |
| 2009/0132622 A1 | 5/2009 | Rossmann et al. |
| 2009/0158288 A1 | 6/2009 | Fulton et al. |
| 2009/0307256 A1 | 12/2009 | Tiyyagura |

(56) References Cited

U.S. PATENT DOCUMENTS

| | | | |
|---|---|---|---|
| 2009/0307292 A1 | 12/2009 | Li et al. | |
| 2009/0319720 A1 | 12/2009 | Stefanus et al. | |
| 2009/0328007 A1 | 12/2009 | Chen et al. | |
| 2010/0011357 A1 | 1/2010 | Ramamurthy | |
| 2010/0070727 A1 | 3/2010 | Harris et al. | |
| 2010/0082710 A1* | 4/2010 | Kilner | G06F 12/0269 707/813 |
| 2010/0114998 A1 | 5/2010 | Steensgaard et al. | |
| 2010/0254254 A1 | 10/2010 | Chan et al. | |
| 2010/0287028 A1 | 11/2010 | Hauser | |
| 2010/0287350 A1 | 11/2010 | Ylonen | |
| 2010/0318892 A1 | 12/2010 | Teevan et al. | |
| 2011/0145473 A1 | 6/2011 | Maheshwari | |
| 2011/0145637 A1 | 6/2011 | Gray et al. | |
| 2011/0161784 A1 | 6/2011 | Selinger et al. | |
| 2011/0197177 A1 | 8/2011 | Mony | |
| 2011/0208792 A1 | 8/2011 | Printezis et al. | |
| 2011/0246543 A1 | 10/2011 | Gracie et al. | |
| 2011/0252075 A1 | 10/2011 | Ylonen et al. | |
| 2011/0252216 A1 | 10/2011 | Ylonen et al. | |
| 2011/0258532 A1 | 10/2011 | Ceze et al. | |
| 2011/0286420 A1 | 11/2011 | Cho et al. | |
| 2012/0203804 A1 | 8/2012 | Burka et al. | |
| 2012/0260157 A1 | 10/2012 | Zhu et al. | |
| 2013/0054925 A1 | 2/2013 | Hsia | |
| 2013/0073821 A1 | 3/2013 | Flynn et al. | |
| 2013/0138703 A1 | 5/2013 | Daynes et al. | |
| 2013/0227236 A1 | 8/2013 | Flynn et al. | |
| 2013/0232402 A1 | 9/2013 | Lu et al. | |
| 2013/0290648 A1 | 10/2013 | Shao et al. | |
| 2013/0318132 A1 | 11/2013 | Basu et al. | |
| 2013/0326333 A1 | 12/2013 | Hashmi | |
| 2013/0332909 A1 | 12/2013 | Odaira et al. | |
| 2014/0032922 A1 | 1/2014 | Spilman | |
| 2014/0033213 A1 | 1/2014 | Hudson et al. | |
| 2014/0101372 A1 | 4/2014 | Jung et al. | |
| 2014/0108817 A1 | 4/2014 | Chen et al. | |
| 2014/0173744 A1 | 6/2014 | Borohovski et al. | |
| 2014/0195818 A1 | 7/2014 | Neumann et al. | |
| 2014/0278447 A1 | 9/2014 | Unoki et al. | |
| 2014/0282872 A1 | 9/2014 | Hansen et al. | |
| 2014/0283040 A1 | 9/2014 | Wilkerson et al. | |
| 2014/0310235 A1 | 10/2014 | Chan et al. | |
| 2014/0325148 A1 | 10/2014 | Choi et al. | |
| 2014/0359201 A1 | 12/2014 | Chakrabarti | |
| 2014/0365719 A1 | 12/2014 | Kuzmin et al. | |
| 2015/0006843 A1 | 1/2015 | Moser | |
| 2015/0026167 A1 | 1/2015 | Neels et al. | |
| 2015/0058381 A1 | 2/2015 | Wilhelmsson | |
| 2015/0081996 A1 | 3/2015 | Flood | |
| 2015/0100752 A1 | 4/2015 | Flood | |
| 2015/0193399 A1 | 7/2015 | Woker et al. | |
| 2015/0193402 A1 | 7/2015 | Ayoub et al. | |
| 2015/0227416 A1 | 8/2015 | Reinart | |
| 2015/0227602 A1 | 8/2015 | Ramu et al. | |
| 2015/0254219 A1 | 9/2015 | Harel | |
| 2015/0365941 A1 | 12/2015 | Liu et al. | |
| 2015/0378870 A1 | 12/2015 | Marron et al. | |
| 2016/0012280 A1 | 1/2016 | Ito et al. | |
| 2016/0042015 A1 | 2/2016 | Landau et al. | |
| 2016/0092566 A1 | 3/2016 | Barouni et al. | |
| 2016/0092591 A1 | 3/2016 | Barouni et al. | |
| 2016/0124802 A1 | 5/2016 | Gabor et al. | |
| 2016/0163381 A1 | 6/2016 | Lee | |
| 2016/0170649 A1 | 6/2016 | Ramesh et al. | |
| 2016/0179580 A1 | 6/2016 | Benedict | |
| 2016/0188548 A1 | 6/2016 | Ciabarra et al. | |
| 2016/0239413 A1 | 8/2016 | Stephens et al. | |
| 2016/0246713 A1 | 8/2016 | Choi et al. | |
| 2016/0283369 A1 | 9/2016 | Hada | |
| 2016/0350214 A1 | 12/2016 | Payer et al. | |
| 2017/0006135 A1 | 1/2017 | Siebel et al. | |
| 2017/0017650 A1 | 1/2017 | Ciabarra et al. | |
| 2017/0039242 A1 | 2/2017 | Milton et al. | |
| 2017/0078286 A1 | 3/2017 | Hunt et al. | |
| 2017/0078310 A1 | 3/2017 | Hunt et al. | |
| 2017/0123655 A1 | 5/2017 | Sinclair et al. | |
| 2017/0177168 A1 | 6/2017 | Abudib et al. | |
| 2017/0177471 A1 | 6/2017 | Frazier et al. | |
| 2017/0242790 A1 | 8/2017 | O'Krafka et al. | |
| 2017/0262364 A1 | 9/2017 | Liden et al. | |
| 2017/0286544 A1 | 10/2017 | Hunt et al. | |
| 2017/0289293 A1 | 10/2017 | Rubtsov et al. | |
| 2017/0308513 A1 | 10/2017 | Hunt et al. | |
| 2017/0344473 A1* | 11/2017 | Gidra | G06F 12/0269 |
| 2018/0074854 A1 | 3/2018 | Chan | |
| 2018/0173728 A1 | 6/2018 | Munakata | |
| 2018/0189175 A1 | 7/2018 | Ji et al. | |
| 2018/0276120 A1 | 9/2018 | Vytiniotis et al. | |
| 2018/0329907 A1 | 11/2018 | De Paris | |
| 2018/0335968 A1 | 11/2018 | Pauley et al. | |
| 2018/0365106 A1 | 12/2018 | Huang et al. | |
| 2019/0028473 A1 | 1/2019 | Hunt et al. | |
| 2019/0042406 A1 | 2/2019 | Guniguntala et al. | |
| 2019/0042440 A1 | 2/2019 | Kumar et al. | |
| 2019/0079906 A1 | 3/2019 | Karppanen | |
| 2019/0340212 A1 | 11/2019 | Isager | |
| 2020/0012600 A1 | 1/2020 | Konoth et al. | |
| 2020/0012647 A1 | 1/2020 | Johnson et al. | |
| 2020/0026781 A1 | 1/2020 | Khot et al. | |
| 2020/0081748 A1 | 3/2020 | Johnson et al. | |
| 2020/0089420 A1 | 3/2020 | Sharoni et al. | |
| 2020/0099735 A1 | 3/2020 | Mashaal et al. | |
| 2020/0125364 A1 | 4/2020 | Osterlund | |
| 2020/0183584 A1 | 6/2020 | Somasundaram et al. | |
| 2020/0192794 A1 | 6/2020 | Lee | |
| 2020/0202127 A1 | 6/2020 | Chen et al. | |
| 2020/0204587 A1 | 6/2020 | Hunt et al. | |
| 2020/0218653 A1 | 7/2020 | Ryu | |
| 2020/0250084 A1 | 8/2020 | Stephens et al. | |
| 2020/0272681 A1 | 8/2020 | Macxis et al. | |
| 2020/0310686 A1 | 10/2020 | Truong et al. | |
| 2020/0310963 A1 | 10/2020 | Nilsen | |
| 2020/0327052 A1 | 10/2020 | Nilsen | |
| 2020/0379902 A1 | 12/2020 | Durham et al. | |
| 2021/0124608 A1 | 4/2021 | Shveidel et al. | |
| 2021/0200546 A1 | 7/2021 | Lemay et al. | |
| 2021/0278990 A1 | 9/2021 | Choi | |
| 2021/0342362 A1 | 11/2021 | Haravu et al. | |
| 2021/0406216 A1 | 12/2021 | Komatsu et al. | |
| 2022/0027340 A1 | 1/2022 | Abdoun et al. | |
| 2022/0058732 A1 | 2/2022 | Reses | |
| 2022/0070205 A1 | 3/2022 | Kashitsyn et al. | |
| 2022/0138098 A1 | 5/2022 | Osterlund et al. | |
| 2022/0159032 A1 | 5/2022 | John et al. | |
| 2022/0188432 A1 | 6/2022 | Turmel et al. | |
| 2022/0345315 A1 | 10/2022 | Ilan | |
| 2022/0374353 A1 | 11/2022 | Sterlund et al. | |
| 2023/0409558 A1 | 12/2023 | Wysocki et al. | |
| 2024/0037164 A1 | 2/2024 | Wang | |
| 2024/0039925 A1 | 2/2024 | Todasco et al. | |
| 2024/0380783 A1 | 11/2024 | Vladislav | |

FOREIGN PATENT DOCUMENTS

| | | | |
|---|---|---|---|
| JP | 4265610 B2 | 5/2009 | |
| WO | 00/29937 A2 | 5/2000 | |
| WO | 2016/073019 A1 | 5/2016 | |
| WO | 2017/053754 A1 | 3/2017 | |
| WO | 2017/178114 A9 | 12/2017 | |

OTHER PUBLICATIONS

Guy Harris, "Thread (computing)", Dec. 2022, pp. 1-10, https://en.wikipedia.org/w/index.php?title=Thread_(computing)&oldid=1128791380 (Year: 2022).

Stephen J. Bigelow, "thread", Aug. 2023, pp. 1-10, https://www.techtarget.com/whatis/definition/thread (Year: 2023).

Sun Microsystems, "What Is a Thread?", 2005, pp. 1-2, https://www.iitk.ac.in/esc101/05Aug/tutorial/essential/threads/definition.html#:~:text=Definition:%20A%20thread%20is%20a,tasks%20in%20a%20single%20program. (Year: 2005).

(56) References Cited

OTHER PUBLICATIONS

"Basic Graph Algorithms", Indian Computing Olympiad, Retrieved from https://www.iarcs.org.in/inoi/online-study-material/topics/graphs-dfs.php, Retrieved on Dec. 8, 2022, pp. 3.
"Lazy Compaction", Retrieved from https://wiki.se.oracle.com/display/JPG/Lazy+Compaction, Retrieved on Sep. 20, 2022, 2 Pages.
"Recitation 8—Dijkstra's Algorithm and DFS Numberings", Parallel and Sequential Data Structures and Algorithms, 15-210 (Fall 2013), Oct. 16, 2013, pp. 1-6.
"What is Schema?" Retrieved from https://github.com/json-schema-org/understanding-json-schema, Jan. 11, 2023, pp. 3.
"ZGC—Generations Revision 2," accessed at https://wiki.se.oracle.com/display/JPG/ZGC+-+Generations+Revision , Feb. 1, 2020, pp. 6.
A concurrent, generational garbage collector for a multithreaded implementation of ML by Doligez (Year: 1993).
A Hardware Accelerator for Tracing Garbage Collection by Maas (Year: 2018).
Benjamin Zorn, Barrier Methods for Garbage Collection, Nov. 1990, UC Boulder available at: https://spl.cde.state.co.us/artemis/ucbserials/ucb51110internet/1990/ucb51110494internet.pdf(Year: 1990).
Boehm et al.; "Efficient In-Memory Indexing with Generalized Prefix Trees", downloaded from https://pdfs.Semanticscholar.org/c5ca/a359fe6b345580a4dd476d5dd41 a90bf301c.pdf; Mar. 26, 2018.
Click et al.; "The Pauseless GC Algorithm", VEE 05, Jun. 11-12, 2005, Chicago, Illinois, USA. Copyright 2005 ACM 1-59593-047-7/05/0006 . . . S5.00.
Clifford et al., "Memento Mori: Dynamic Allocation-Site-Based Optimizations", ACM SIGPLAN Notices, vol. 50, No. 11, Jun. 14, 2015, pp. 105-117.
David Gnedt, "Fast Profiling in the HotSpot Java VM with Incremental Stack Tracing and Partial Safepoints," Faculty of Engineering and Natural Sciences, 2014, 57 pages.
DETLEFS; "Concurrent Remembered Set Refinement in Generational Garbage Collection", Proceedings of the USENIX Java VM '02 Conference, Aug. 1-2, 2002, San Francisco, CA.
Domani et al., "Implementing an On-the-fly Garbage Collector for Java," ACM SIGPLAN Notices, vol. 36, No. 1, 2000, pp. 155-166.
Dorai et al., Control delimiters and their hierarchies, LISP and Symbolic Computation: An International Journal, vol. 3, 1990, pp. 67-99.
Ellis D., "What is Swagger? A beginner's guide", Jul. 26, 2022, pp. 6.
Feng et al.; "Trie-join: a trie-based method for efficient string similarity joins", Published online Oct. 4, 2011; The VLDB Journal Springer-Verlag 2011.
Fitzgerald; "The Case for Profile Directed Selection of Garbage Collectors", Proceedings of the 2nd International Symposium on Memory Management, ACM, New York, NY USA, 111-120, DOI= 10.1145/362422.362472, http://doi.acm.org/10.1145/362422.362472.
Generational Garbage Collection, Write Barriers/Write Protection and userfaultfd(2) by Cracauer (Year: 2016).
Getting started with Z Garbage Collector(ZGC) in Java 11 [Tutorial] by Davis (Year: 2019).
Goetz, Java theory and practice Garbage collection in the HotSpot JVM, Generational and concurrent garbage collection, IBM Developer Works, Nov. 25, 2003.
Harris T, et al., "Dynamic filtering: multi-purpose architecture support for language runtime systems," ACM SIGARCH Computer Architecture News, vol. 38, Issue 1, Mar. 2010, pp. 39-52.
Heule et al., "HyperLogLog in practice: algorithmic engineering of a state of the art cardinality estimation algorithm," EDBT '13: Proceedings of the 16th International Conference on Extending Database Technology, Mar. 2013, pp. 683-692.
Hosking; "A Comparative Performance Evaluation of Write Barrier Implementations", Proceedings ACM Conference on Object-Oriented Programming Systems, Languages and Applications, Vancouver, Canada, Oct. 1992, pp. 92-109.
How to Implement Java's hashCode Correctly, May 19, 2016, Available online at <https://www.sitepoint.com/how-to-implement-javas-hashcode-correctly/>, 7 pages.
JDK 15, Available online at < https://openjdk.java.net/projects/jdk/15/ >, Last updated, Sep. 15, 2020, 2 pages.
JEP 333: ZGC: A Scalable Low-Latency Garbage Collector(Experimental) by Liden and Karlsson (Year: 2020).
Kliot et al., "A Lock-Free, Concurrent, and Incremental Stack Scanning for Garbage Collectors," In Proceedings of the ACM SIGPLAN/SIGOPS International Conference on Virtual Execution Environments (VEE '09), 2009, pp. 11-20.
Lokesh Gupta, "Java Secure Hashing—MD5, SHA256, SHA512, PBKDF2, BCrypt, Scrypt," Available online at <https://howtodoinjava.com/security/how-to-generate-secure-password-hash-md5-sha-pbkdf2-bcrypt-examples/> printed on Apr. 14, 2020, 38 pages.
M. Felleisen et al., Beyond Continuations: Technical Report No. 216, Feb. 1987, 13 pages.
Mohamed A. El-Zawawy, "Recognition of Logically Related Regions Based Heap Abstraction", Journal of the Egyptian Mathematical Society,vol. 20, Issue 2, Jul. 2012, pp. 64-71, arXiv:1212.5094 [cs.LO].
Mostly Concurrent Garbage Collection Revisited by Barabash (Year: 2003).
Open JDK, "HotSpot Glossary of Terms", 2006, Sun Microsystems, available at <https://openjdk.java.net/groups/hotspot/docs/HotSpotGlossary.html>, 6 pages.
Osterlund E., "Garbage Collection supporting automatic JIT parallelization in JVM", Computer Science, Jun. 26, 2012, pp. 29.
Osterlund E., "Going Beyond On-The-Fly Garbage Collection and Improving Self-Adaptation with Enhanced Interfaces", Computer Science, 2019, pp. 68.
Osterlund et al., "Block-Free Concurrent GC: Stack Scanning and Copying," International Symposium on Memory Management, vol. 51, 2016, 12 pages.
Per Liden, The Design of ZGC—A scalable Low-Latency Garbage Collector for Java: available online at <http://cr.openjdk.java.net/~pliden/slides/ZGC-PLMeetup-2019.pdf>, Jun. 12, 2019, 84 pages.
Pufek et al., "Analysis of Garbage Collection Algorithms and Memory Management in Java", 2019 42nd International Convention on Information and Communication Technology, Electronics and Microelectronics (MIPRO), Croatian Society MIPRO, May 20, 2019, pp. 1677-1682.
Robbin Ehn, "JEP 312: Thread-Local Handshakes," Hotspot Dash Dev at Openjdk Dot Java Dot Net, available at <http://openjdk.java.net/jeps/312>, 2018, 3 pages.
Rogers I., "Reducing and eliding read barriers for concurrent garbage collectors," ICOOOLPS '11: Proceedings of the 6th Workshop on Implementation, Compilation, Optimization of Object-Oriented Languages, Programs and Systems, Jul. 2011, Article No. 5, pp. 1-5.
Saxena et al., "Key and Value Paired Data using Java Hash Table," International Journal of Engineering and Management Research, vol. 4, Issue 1, Feb. 2014, pp. 81-89.
Stefan Karlsson, JEP 439: Generational ZGC, Aug. 25, 2021, OpenJDK, available at: https://openjdk.org/jeps/439 (Year: 2021).
The Z Garbage Collector—Low Latency GC OpenJDK, available online at <http://cr.openjdk.java.net/~pliden/slides/ZGC-Jfokus-2018.pdf>, 2018, 96 pages.
Title: Detecting and eliminating memory leaks using cyclic memory allocation, author: JJ Nguyen et al, published on 2007.
Title: Reconsidering custom memory allocation; author:: ED Berger et al, published on 2002.
Title: Understanding memory allocation of Scheme programs author: M Serrano published on 2000.
Vechev et al. "Write Barrier Elision for Concurrent Garbage Collectors", 2004 (Year: 2004).
Verma A., "The comprehensive guide to react's virtual DOM", May 15, 2021, pp. 23.
Wilson, P.R., et al., "A "Card-making" scheme for controlling intergenerational differences in generation-based garbage collection on stock hardware," ACM SIGPLAN Notices, vol. 24, Issue 5, May 1989, pp. 87-92.

(56) References Cited

OTHER PUBLICATIONS

Write Barrier Elision for Concurrent Garbage Collectors by Vechev (Year: 2004).

Yang et al., "Deep Dive into ZGC: A Modern Garbage Collector in OpenJDK", ACM Transactions on Programming Language and Systems, ACM, New York, NY, 2022, vol. 44, No. 4, 34 Pages.

Yang et al., "Improving Program Locality in the GC using Hotness," PLDI'20, pp. 301-313, Jun. 15-20, 2020.

Yuasa et al., "Return Barrier", International Lisp Conference, 2002, pp. 1-12 (Year: 2002).

Yuasa et al., "Return Barrier," International Lisp Conference, 2002, 12 pages.

Yuasa, T., "Real-time garbage collection on general-purpose machines," Journal of Systems and Software, vol. 11, Issue 3, Mar. 1990, pp. 181-198.

ZGC Concurrent Class Unloading—Another Safepoint Operation Bites the Dust: available online at <http://cr.openjdk.java.net/~pliden/slides/ZGC-Jfokus-2019.pdf>, Feb. 4, 2019, 55 pages.

Zhao et al., "Low-latency, high-throughput garbage collection", PLDI 2022: Proceedings of the 43rd ACM SIGPLAN International Conference on Programming Language Design and Implementation, Jun. 2022, pp. 76-91.

Pekka, "Barrier techniques for incremental tracing" chrome-extension://efaidnbmnnnibpcajpcglclefindmkaj/https://dl.acm.org/doi/pdf/10.1145/301589.286863, 1998, (Year: 1998).

"JEP 439: Generational ZGC", Retrieved from https://openjdk.org/jeps/439, Oct. 7, 2024, pp. 1-9.

Shoravi L., "Compressing Pointers for the Z Garbage Collector", Runtime compression of pointers in a concurrent setting, Jun. 2023, 38 Pages.

Yang et al., "Deep Dive into ZGC: A Modern Garbage Collector in OpenJDK", ACM Transactions on Programming Languages and Systems, vol. 44, No. 4, Article 22, Aug. 2022, 34 pages.

\* cited by examiner

SELECTING GARBAGE COLLECTION PROCESSES

TECHNICAL FIELD

The present disclosure relates to garbage collection processes utilized by runtime environments to reclaim memory that is no longer in use or that is no longer accessible. More particularly, the present disclosure relates to selection of a garbage collection process from a group of garbage collection processes.

BACKGROUND

A runtime environment may utilize a garbage collection process to reclaim memory that is no longer in use or that is no longer accessible to threads that may be executing in the runtime environment. A garbage collection process may be built into the runtime environment and may be executed automatically. By reclaiming memory that is no longer in use or that is no longer accessible, the reclaimed memory can be reallocated to other purposes. Additionally, reclaiming memory prevents memory leaks, whereby system memory is gradually consumed because of memory remaining unreleased even after the memory is no longer being utilized.

The content of this background section should not be construed as prior art merely by virtue of its presence in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
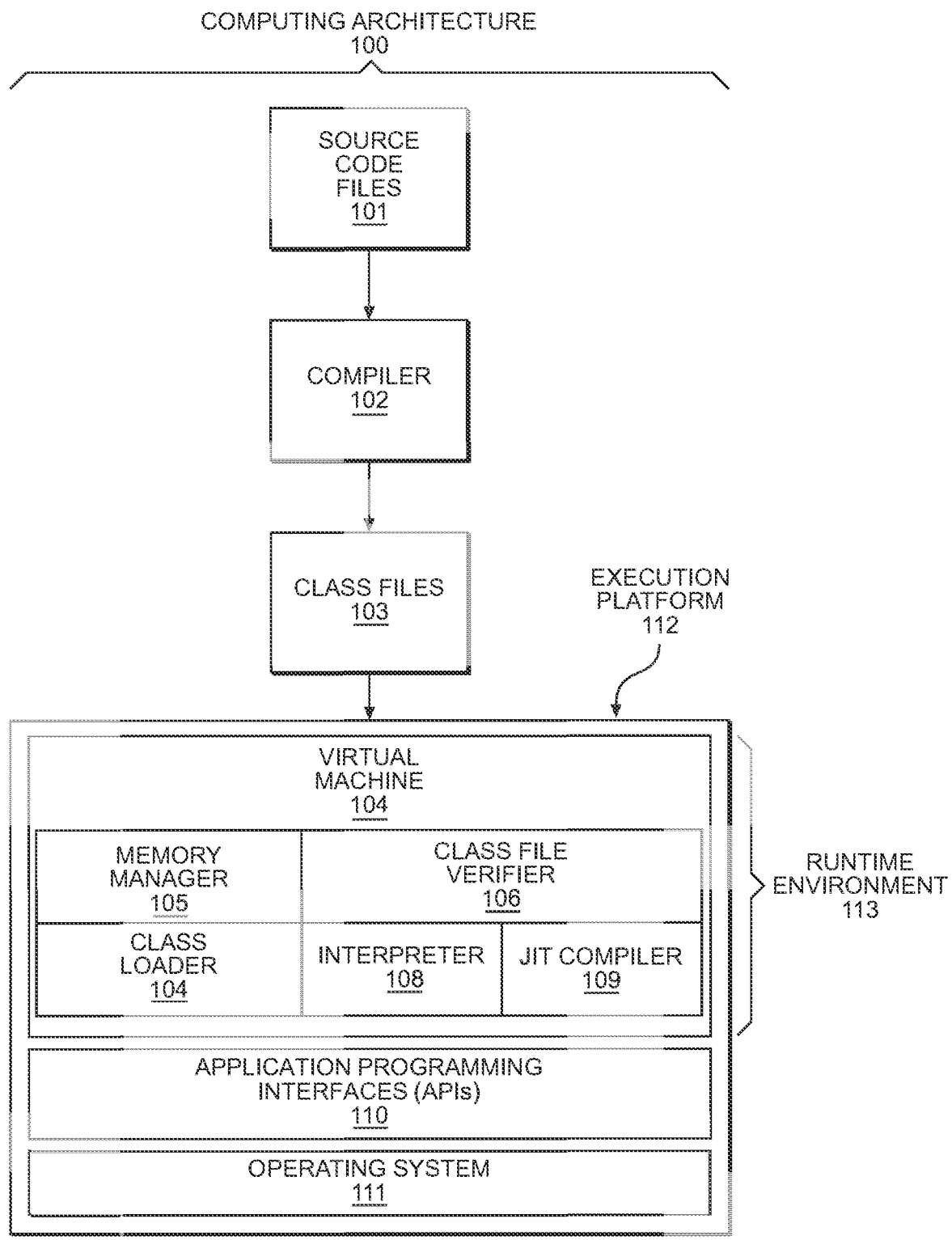
FIG. 1 illustrates an example computing architecture in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. DEFINITIONS
3. ARCHITECTURAL OVERVIEW
   3.1 EXAMPLE CLASS FILE STRUCTURE
   3.2 EXAMPLE VIRTUAL MACHINE ARCHITECTURE
   3.3 LOADING, LINKING, AND INITIALIZING
4. EXAMPLE OPERATIONS
   4.1 SELECTING GARBAGE COLLECTION PROCESSES
   4.2 DISQUALIFYING THREADS FROM SWEEPING THREAD-LOCAL GARBAGE COLLECTION
5. HARDWARE OVERVIEW
6. MISCELLANEOUS; EXTENSIONS

1. General Overview

A system selects a garbage collection (GC) process for a thread based on whether or not the thread has encountered a shared object that is (a) stored in a private memory region and (b) may be accessed by one or more additional threads. If the thread does not encounter any shared objects that are stored in a private memory region, the system may execute a sweeping thread-local garbage collection (sweeping TLGC) process that reclaims memory associated with the thread when or after the thread terminates. If the thread encounters a shared object that is stored in a private memory region and may be accessible by another thread, the system executes a selective garbage collection (selective GC) process that selectively reclaims a subset of memory blocks corresponding to a subset of private objects that are inaccessible from any thread. Any shared objects that are stored in a private memory region are not reclaimed in the selective GC process because such shared objects might be accessible by one or more additional threads. The selective GC process may include a thread-local selective GC process that includes identifying and reclaiming memory blocks corresponding to a subset of private objects from a private memory region allocated for the terminated thread. Additionally, or alternatively, the selective GC process may include a global selective GC process that includes identifying and reclaiming memory blocks corresponding to a subset of private objects from a plurality of private memory regions.

In one example, execution of a first thread may include storing a first set of objects in a first private memory region. Upon or after termination of the first thread, the system may execute the sweeping TLGC process in response to determining that the first set of objects is exclusive of any shared objects accessible by one or more additional threads. Additionally, or alternatively, execution of a second thread may include storing a second set of objects in a second private memory region. The second set of objects may include at least one shared object that may be accessed by one or more additional threads. Upon or after termination of the second thread, the system may execute the selective GC process in response to determining that the second set of objects includes at least one shared object accessible by one or more additional threads.

In one example, execution of a first thread may include loading a first set of objects. Upon or after termination of the first thread, the system may execute the sweeping TLGC process to reclaim a first private memory region allocated for the first thread in response to determining that the first set of objects is exclusive of any shared objects stored in any private memory region and accessible by one or more additional threads. Additionally, or alternatively, execution of a second thread may include loading a second set of objects. The second set of objects may include at least one shared object that is stored in a private memory region and that may be accessed by one or more additional threads. Upon or after termination of the second thread, the system may execute the selective GC process in response to determining that the second set of objects includes at least one shared object that is stored in a private memory region and that may be accessed by one or more additional threads.

In one example, the system may disqualify virtual threads from eligibility for execution of the sweeping TLGC process when the respective virtual thread stores or loads a pointer that includes a reference to a shared object in the private memory region. For virtual threads that are not disqualified, the sweeping TLGC process may be executed when the virtual thread exits. For virtual threads that are disqualified, the sweeping TLGC process is not executed. Instead, a selective GC process may be executed to selectively reclaim a subset of memory blocks corresponding to a subset of private objects that are inaccessible from any thread.

In one example, a first virtual thread may store a pointer to a shared memory region, and the system may determine that the pointer includes a reference to a location of a shared object in a first private memory region. In response to determining that the pointer references the first private memory region, the system may designate the first virtual thread as disqualified from eligibility for execution of the sweeping TLGC process. Additionally, the system may augment the pointer to indicate that the pointer includes the reference to the first private memory region. The augmentation to the pointer may serve as an indicator for the system to disqualify other threads that load the pointer from eligibility for execution of the sweeping TLGC process. In one example, when a second virtual thread loads a pointer, the system may determine that the pointer has been augmented to indicate that the pointer includes a reference to a location of a shared object in a private memory region. In response to determining that the pointer has been augmented to indicate that the pointer references the private memory region, the system may designate the second virtual thread as disqualified from eligibility for execution of the sweeping TLGC process.

In one example, the augmentation to the pointer may trigger an error in response to a virtual thread loading the pointer. The system may determine the error, and responsive to determining the error, the system may execute an error-handling operation on the pointer. The error-handling operation is configured to distinguish errors induced by the pointer having been augmented to indicate that the pointer includes a reference to a private memory region from other known or unknown errors that may arise. When the error-handling operation determines that the error is attributable to the pointer having been augmented to indicate that the pointer references a private memory region, the system designates the virtual thread that loaded the pointer as disqualified from eligibility for execution of the sweeping TLGC process. Additionally, the system may utilize the error-handling operation to resolve the error, including determining a location of the shared object referenced by the pointer. Upon having resolved the error, the virtual thread that loaded the pointer may proceed to access the shared object.

By augmenting pointers that include a reference to a private memory region when the pointer is stored, the system may detect the augmentation when the pointer is loaded, and the system may disqualify the virtual thread that loaded the pointer from eligibility for execution of the sweeping TLGC process. Additionally, by utilizing an augmentation that triggers an error when the pointer is loaded, the system may detect the augmentation without having to directly interrogating each individual pointer that is loaded. As a result, the sweeping TLGC process may be executed for virtual threads that are not disqualified without risk of inadvertently reclaiming memory blocks associated with a shared objects that might be accessed by other virtual threads. In one example, execution of a sweeping TLGC process may be particularly advantageous in the context of virtual threads due to the large number of virtual threads that may be managed by a runtime environment. However, a sweeping TLGC process may also be executed with respect to other types of threads, and the aforementioned advantages may be realized.

One or more embodiments described in this Specification and/or recited in the claims may not be included in this General Overview section.

2. Definitions

As used herein, the term "garbage collection" or "GC" refers to a process of reclaiming memory that is no longer in use.

As used herein, the term "sweeping thread-local garbage collection" or "sweeping TLGC" refers to a process of reclaiming an entirety of a private memory region associated with a particular thread. A sweeping TLGC process may be executed with respect to one or more of the following: a virtual thread, a carrier thread, a platform thread, or an operating system thread that is managed within a runtime environment by a platform thread.

As used herein, the term "selective garbage collection" or "selective GC" refers to a process of selectively reclaiming from at least one private memory region, a subset of memory blocks allocated for a subset of private objects that are inaccessible from any thread. The process of selectively reclaiming the subset of memory blocks may include identifying memory blocks that are inaccessible from any thread and reclaiming the identified memory blocks. A selective GC process may be executed with respect to one or more of the following: a virtual thread, a carrier thread, a platform thread, or an operating system thread that is managed within a runtime environment by a platform thread.

As used herein, the term "global selective garbage collection" or "global selective GC" refers to a selective GC process that is executed with respect to a plurality of threads. A global selective GC process may be executed with respect to one or more of the following: a plurality of virtual threads, a plurality of carrier threads, a plurality of platform threads, or a plurality of operating system threads that are respectively managed within a runtime environment by a platform thread.

As used herein, the term "thread-local selective garbage collection" or "thread-local selective GC" refers to refers to a selective GC process that is executed with respect to a particular thread. A thread-local selective GC process may be executed with respect to one or more of the following: a virtual thread, a carrier thread, a platform thread, or an operating system thread that is managed within a runtime environment by a platform thread.

As used herein, the term "thread" refers to an independent set of one or more instructions representing a unit of execution within a process executable by a computing system. In one example, a thread may be the smallest unit of processing that can be scheduled. Multiple threads may execute concurrently and/or independently of one another. The term "thread" includes threads that are managed by an operating system as well as threads that are managed by a runtime environment. Threads that are managed by an operating system may include operating system threads. Threads that are managed by a runtime environment may include platform threads and virtual threads.

As used herein, the term "operating system thread" refers to a thread that is managed by an operating system kernel at an operating system-level, and that is managed within a runtime environment by a platform thread. The runtime environment provides a layer of abstraction, and the platform thread may manage the execution and behavior of the underlying operating system thread within the constraints and abstractions provided by the runtime environment.

As used herein, the term "platform thread" refers to a thread that is implemented by a runtime environment as a wrapper around an operating system thread and that is schedule for execution by the operating system. The runtime environment may map a particular platform thread to a particular operating system thread in a one-to-one relationship. The operating system thread remains occupied by the platform thread until the platform thread is terminated. In one example, a platform thread may execute Java code on an underlying operating system thread. In one example, a platform thread may be an instance of the java.lang.Thread class that is implemented as a wrapper around an operating system thread. An operating system thread can be managed within a runtime environment by a platform thread also executing in the runtime environment.

As used herein, the term "virtual thread" refers to a thread that is implemented by a runtime environment and that is scheduled by the runtime environment for execution via a carrier thread such as a platform thread. The runtime environment may schedule multiple virtual threads for execution across a group of carrier threads. Typically, many virtual threads are scheduled across a small number of carrier threads. For a particular virtual thread, the runtime environment may select a carrier thread from the group of carrier threads and may mount the virtual thread to the selected carrier thread. The operating system may schedule the carrier thread for execution, thereby allowing the virtual thread to execute instructions via the operating system thread that is mapped to the carrier thread. Subsequently, the runtime environment may unmount a virtual thread from a carrier thread, thereby making the carrier thread available to another virtual thread. The runtime environment may schedule the multiple virtual threads for execution across the group of carrier threads to provide improved throughput relative to executing operations directly via platform threads. In one example, when a virtual thread encounters a blocking operation, such as a blocking I/O operation, the runtime environment may execute a non-blocking operating system call for execution via the operating system thread mapped to the carrier thread. Additionally, the runtime environment may suspend execution of the virtual thread and unmount the virtual thread from the carrier thread, so the carrier may be utilized by another virtual thread while the blocking operation is executed. The operating system may execute the operation asynchronously without blocking execution of the carrier thread or the operating system thread. When the blocking operation is ready to complete, such as when bytes have been received on a socket, the runtime environment may schedule the virtual thread to be mounted on another carrier thread to resume execution of the virtual thread. A virtual thread may be scheduled to execute via one or more carrier threads over the lifecycle of the virtual thread.

As used herein, the term "carrier thread" refers to a thread that a runtime environment schedules to execute one or more operations of a virtual thread via an operating system thread. The carrier thread may serve as an intermediary between the virtual thread, scheduled by the runtime environment, and an operating system thread, scheduled by the operating system. The use of carrier threads allows the runtime environment to manage a larger number of virtual threads without the overhead that would be associated with creating and managing a one-to-one mapping between virtual threads and individual operating system threads.

As used herein, the term "blocking operation" refers to an operation of a thread that halts the progress of further code execution of the thread until the operation is complete.

As used herein, the term "blocking I/O operation" refers to a blocking operation that involves an interaction with an external resource, such as reading from or writing to files, making network requests, or accessing peripheral devices. A blocking I/O operation may include an input operation, such as a read operation, or an output operation, such as a write operation.

3. Architectural Overview

FIG. 1 illustrates an example architecture in according to at least one embodiment. Software and/or hardware components described with relation to the example architecture may be omitted or associated with a different set of functionalities than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 that are compiled by a compiler 102 into class files 103 representing the program to be executed. The class files 103 are then loaded and executed by an execution platform 112. The execution platform 112 includes a runtime environment 113, an operating system 111, and one or more application programming interfaces (APIs) 110 that enable communication between the runtime environment 113 and the operating system 111. The runtime environment 113 includes a virtual machine 104 that includes various components, such as a memory manager 105, a class file verifier 106, a class loader 107, an interpreter 108, and a just-in-time (JIT) compiler 109. The memory manager 105 may include a garbage collector. The garbage collector may execute garbage collection operations. The class file verifier 106 may check the validity of class files 103. The class loader 107 may locate and build in-memory representations of classes. The interpreter 108 may execute the virtual machine 104 code. The JIT compiler 109 may producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification. The exact programming language used to write the source code files 101. Various programming languages may be utilized for various different embodiments.

In various embodiments, the compiler 102 may convert the source code, written according to a specification directed to the convenience of the programmer, to either machine or object code that is executable directly by the particular machine environment. Additionally, or alternatively, the compiler 102 may convert the source code to an intermediate representation ("virtual machine code/instructions") such as bytecode that is executable by a virtual machine 104. The virtual machine 104 may be capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware where the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) that are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions that replaces the "hot" block of code for future executions. Since programs tend to spend a significant proportion of time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above-described example, such as tiered compiling.

To provide clear examples, the source code files 101 have been illustrated as the "top level" representation of the program to be executed by the execution platform 112.

Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format, and the class files 103 are expected to adhere to the particular class file format. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages" that respectively include a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

3.1 Example Class File Structure

Figure 2:
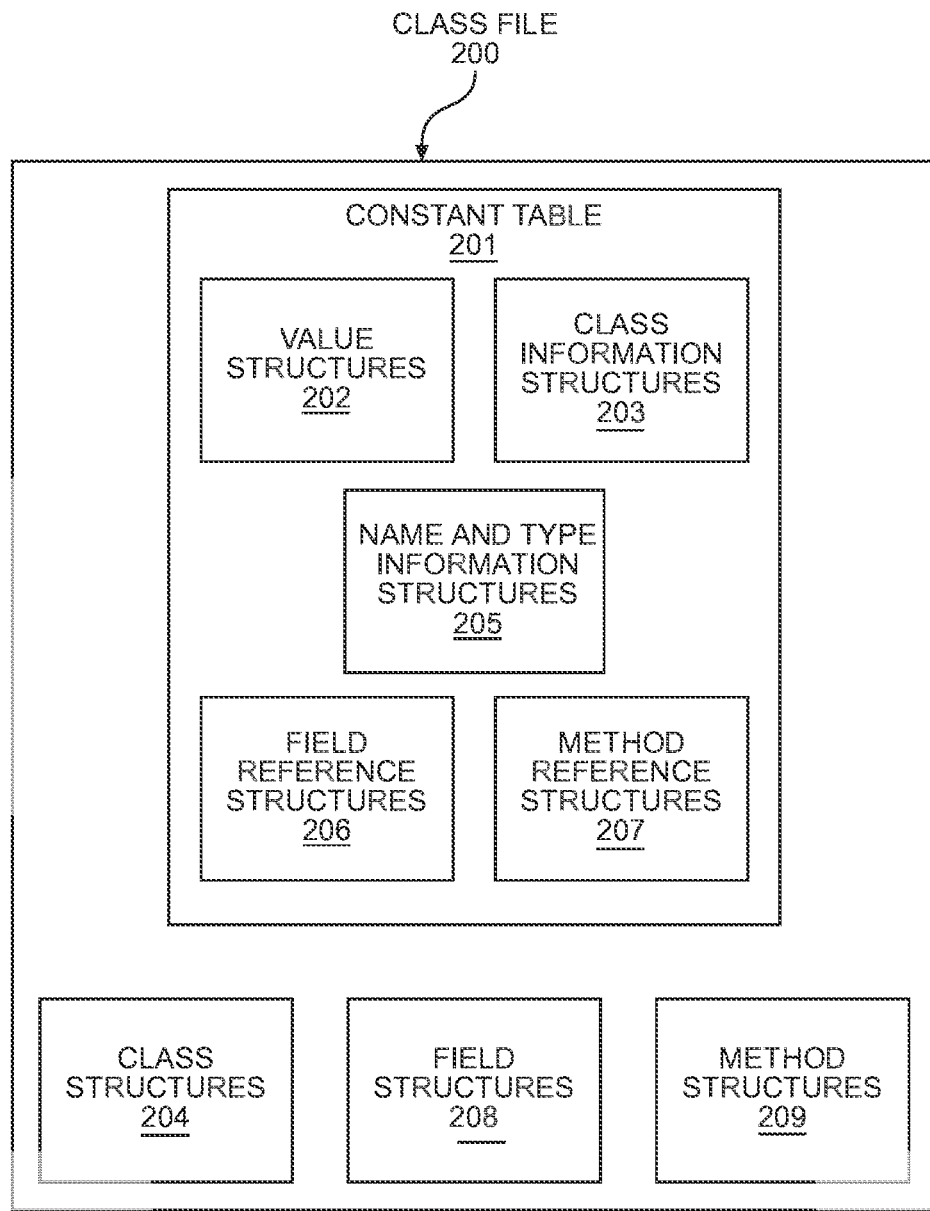
FIG. 2 is a block diagram illustrating one embodiment of a computer system suitable for implementing methods and features described herein.

FIG. 2 illustrates an example structure for a class file 200 in block diagram form according to an embodiment. To provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure that, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures that index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g., "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m (int I, double d, Thread t) { . . . }" matches the descriptor "(I D L Thread) L Object".

In an embodiment, the virtual machine instructions held in the method structures 209 include operations that reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12 and13 calls static method addTwo of class B. The static method addTwo of class B takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

3.2 Example Virtual Machine Architecture

Figure 3:
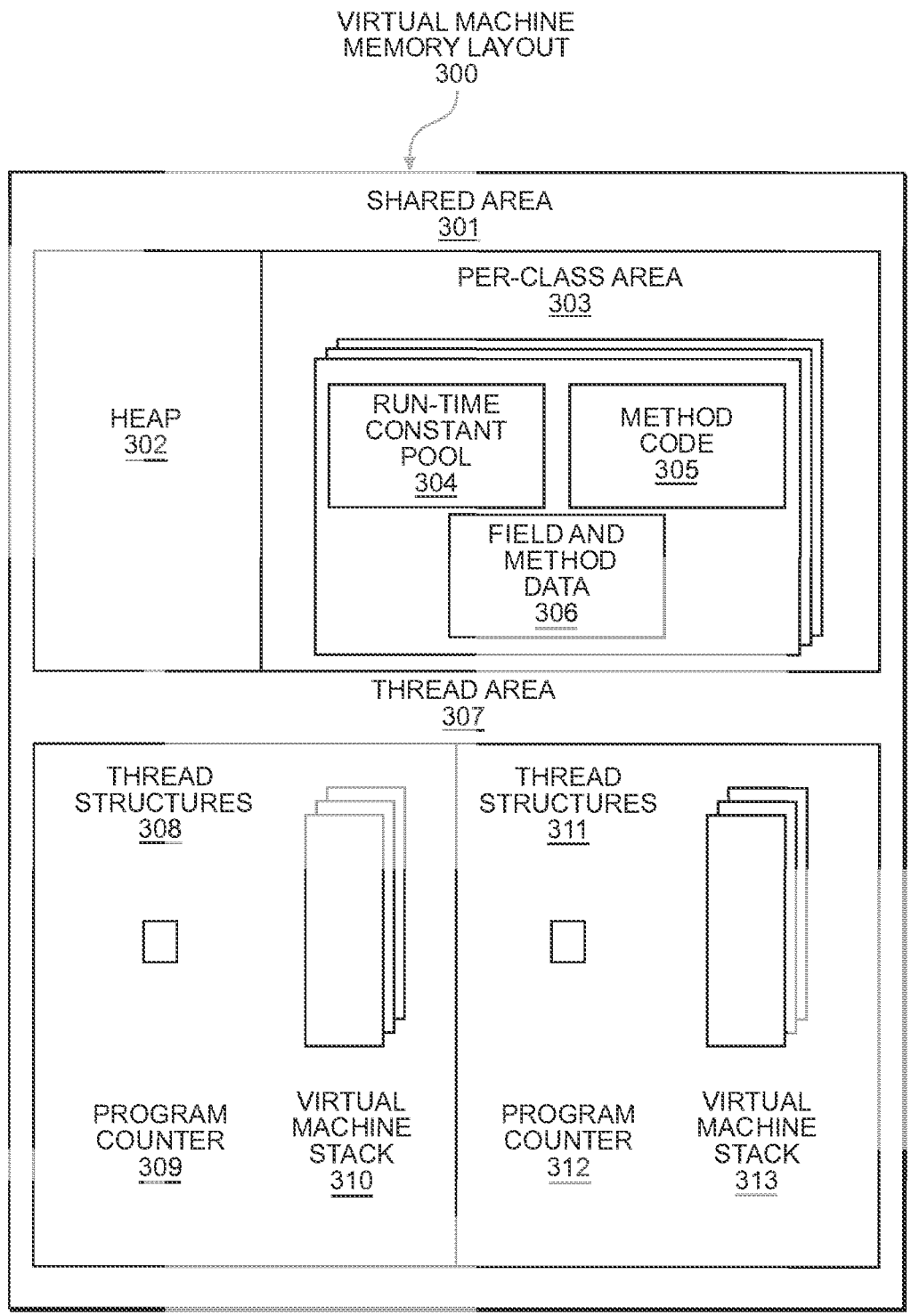
FIG. 3 illustrates an example virtual machine memory layout in block diagram form according to an embodiment.

FIG. 3 illustrates an example virtual machine memory layout 300 in block diagram form according to an embodiment. To provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas be contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area where memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field, and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. To provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class that the current method belongs is referred to as the current class.

Referring further to FIG. 3, in one example, the shared area may include the heap 302 and an off-heap memory 314. One or more memory regions may be located within the heap 302. Each memory region located in the heap 302 may include one or more shared memory segments that are accessible by a set of accessing threads. The off-heap memory 314 may include one or more memory regions located outside the heap 302. Each memory region located in the off-heap memory 314 may include one or more shared memory segments that are accessible by a set of accessing threads. In one example, the off-heap memory 314 and/or a memory region located in the off-heap memory 314 may be managed by an application or by a provisioning thread, for example, instead of the JVM. In one example, the off-heap memory 314 and/or a memory region located in the off-heap memory 314 may be utilized for non-managed data structures, such as large buffers, caches, or custom data models. Additionally, or alternatively, the off-heap memory 314 and/or a memory region located in the off-heap memory 314 may be utilized for data structures that exceed the capacity of the heap 302 and/or that require more efficient memory handling. Additionally, or alternatively, the off-heap memory 314 and/or a memory region located in the off-heap memory 314 may be utilized to provide interaction with native libraries or to provide direct memory access.

Figure 4:
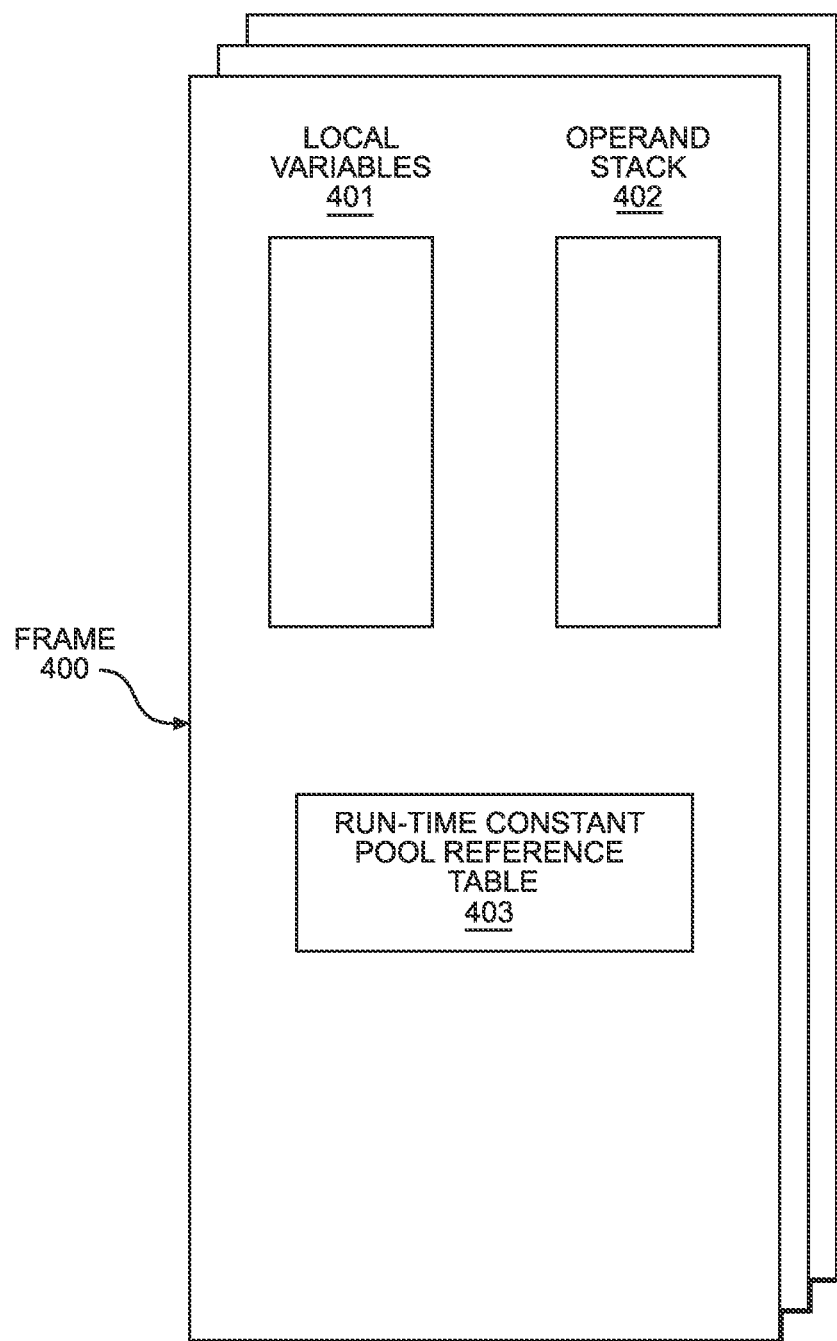
FIG. 4 illustrates an example frame in block diagram form according to an embodiment.

FIG. 4 illustrates an example frame 400 in block diagram form according to an embodiment. To provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

3.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in some embodiments the steps may be interleaved, such that an initial class is loaded, then during linking a second class is loaded to resolve a symbolic reference found in the first class. The loading of the second class, in turn, causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary between implementations.

To begin the loading process, the virtual machine 104 starts up by invoking the class loader 107, and the class loader 107 loads an initial class. The technique whereby the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception that is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking, and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, and this might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located or until the top-level superclass is reached. If the top-level super class is reached, an error may be generated.

4. Example Operations

Figure 5A:
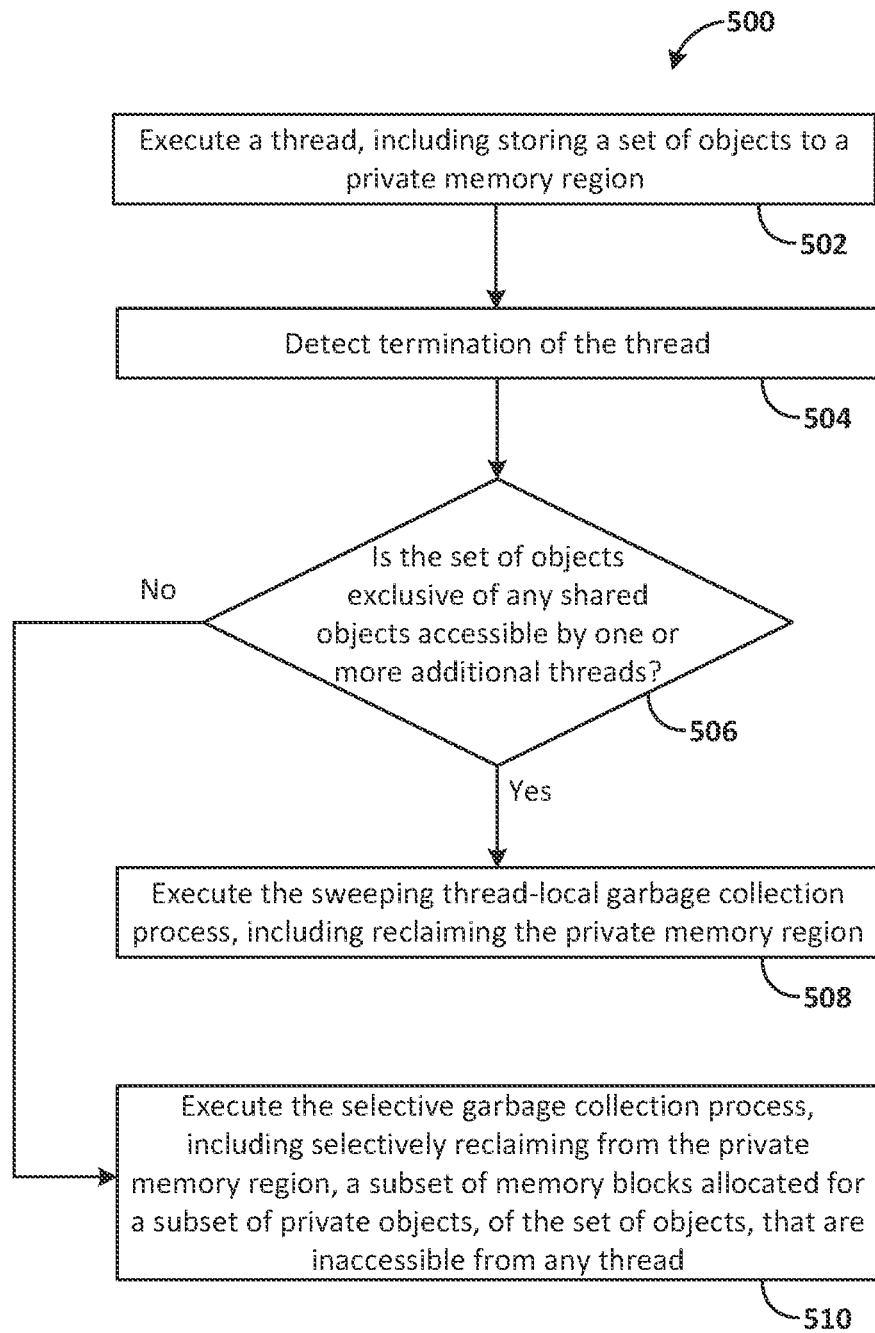
FIGS. 5A-5C are flowcharts that illustrate example operations pertaining to selection of garbage collection processes.
Figure 5B:
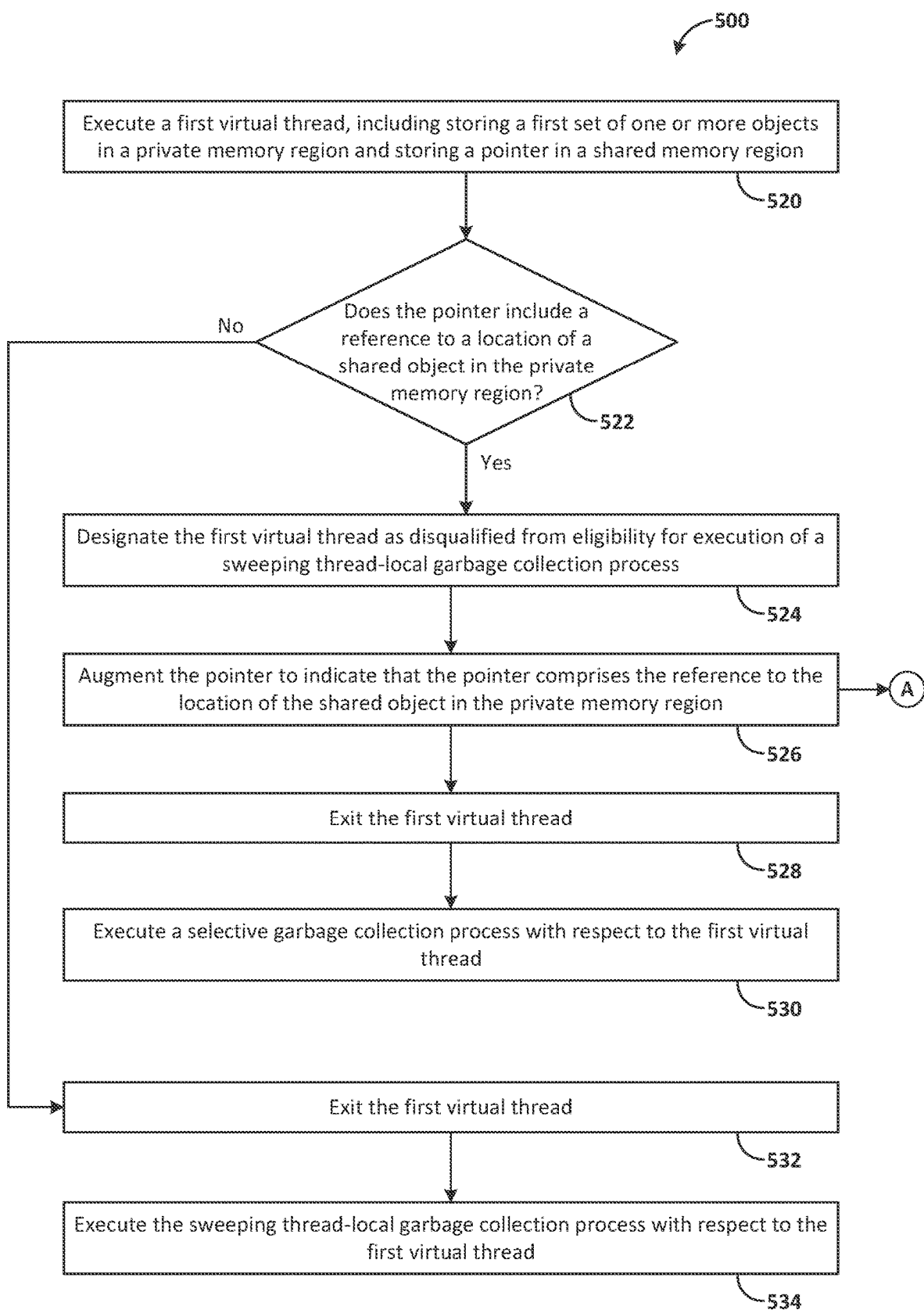
Figure 5C:
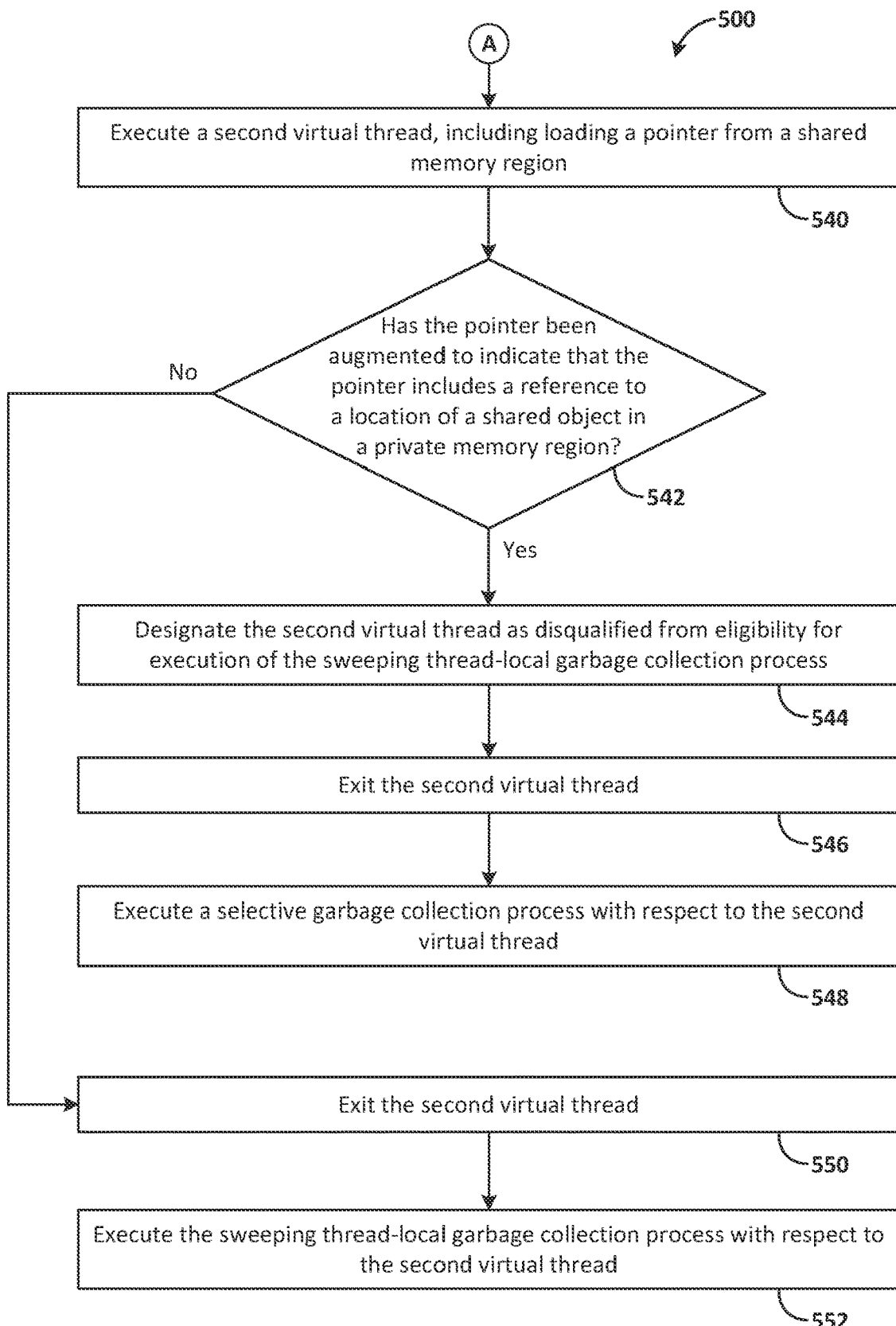

Referring now to FIGS. 5A-5C, operations 500 pertaining to selecting GC processes are further described. The operations 500 described with reference to FIG. 5A may include selecting a GC process from a group of GC processes to be executed upon a particular thread or upon a set of threads. The operations 500 described with reference to FIG. 5B may include disqualifying a particular thread from eligibility for execution of a sweeping TLGC process based at least in part on the thread having stored a pointer in a shared memory region that includes a reference to a shared object located in a private memory region. The operations 500 described with reference to FIG. 5C may include disqualifying a particular thread from eligibility for execution of a sweeping TLGC process based at least in part on the thread having loaded a pointer that includes a reference to a shared object located in a private memory region. The operations 500 described with reference to FIGS. 5A-5C may be executed with respect to any type of thread, including a virtual thread, a carrier thread, a platform thread, and/or an operating system thread that is managed within a runtime environment by a platform thread.

One or more operations 500 described with reference to FIGS. 5A-5C may be executed using one or more components of the computing architecture described with reference to FIGS. 1-4. One or more operations 500 described with reference to FIGS. 5A-5C may be modified, combined, rearranged, or omitted. Accordingly, the particular sequence of operations 500 described with reference to FIGS. 5A-5C should not be construed as limiting the scope of one or more embodiments.

4.1 Selecting a Garbage Collection Processes

Referring to FIG. 5A, operations pertaining to selecting GC processes are further described. As shown in FIG. 5A, the operations 500 may include, at block 502, executing a thread. In one example, executing the thread may include storing a set of objects in a private memory region. Additionally, or alternatively, executing the thread may include storing a set of pointers in the private memory region. The pointers may include a reference to a location of a particular object in the private memory region. The private memory region may include at least a portion of a thread area as described with reference to FIG. 3. In one example, the private memory region may include a set of memory blocks allocated for the thread. Additionally, or alternatively, the private memory region may include a set of thread structures and/or a virtual machine stack associated with the thread. In one example, executing the thread may include storing a set of objects in a shared memory region. Additionally, or alternatively, executing the thread may include storing a set of pointers in the shared memory region. The shared memory region may include at least a portion of the shared area as described with reference to FIG. 3. In one example, the shared memory region may include at least a portion of a heap corresponding to the shared area.

At block 504, the operations 500 may include detecting termination of the thread. The termination of the thread may be detected by a thread status checking algorithm that queries the status of the thread. In one example, in Java, the "Thread.isAlive( )" operator may be utilized to check whether a thread is still running. Additionally, or alternatively, a thread can register a callback or signal that gets triggered upon termination. Additionally, or alternatively, a thread variable may indicate whether a thread is active or terminated. An event handler may monitor the thread variable for one or more threads to determine threads are active and/or to determine when a thread is terminated. Additionally, or alternatively, an exception handling mechanism may detect thread termination events.

At block 506, the operations 500 may include determining whether or not the set of objects is exclusive of any shared objects that are accessible by one or more additional threads. The determination as to whether or not the set of objects is exclusive of any shared objects that are accessible by one or more additional threads may be performed at block 506 to select a GC process from a group of GC processes. The group of GC processes may include a sweeping TLGC process and a selective GC process. When the set of objects is exclusive of any shared objects that are accessible by one or more additional threads, the operations may proceed to block 508 and a sweeping TLGC process may be selected. When the set of objects includes at least one shared object that is accessible by one or more additional threads, the operations may proceed to block 510, and a selective GC process may be selected.

The determination as to whether or not the set of objects is exclusive of any shared objects that are accessible by one or more additional threads may be performed at least by determining whether respective objects are private or shared. In one example, the determination may be performed when the respective objects are stored and/or when the respective objects are loaded. Additionally, or alternatively, the determination as to whether or not the set of objects is exclusive of any shared objects that are accessible by one or more additional threads may be performed at least by determining whether pointers that respectively point to an object are shared pointers or private pointers. In one example, the determination may be performed when the respective pointers are stored and/or when the respective pointers are loaded.

In one example, executing a thread at block 502 may include executing a plurality of store operations. The plurality of store operations may include storing a plurality of objects in a private memory region. Additionally, or alternatively, the plurality of store operations may include storing a plurality of pointers. At block 506, the determination as to whether or not the set of objects is exclusive of any shared objects that are accessible by one or more additional threads may be performed at least in part at a store barrier when storing a respective object and/or when storing a respective pointer. Each store operation corresponding to an object may be interrogated at the store barrier by executing an object interrogation operation to determine whether the store operation includes storing, in a private memory region, a shared object that is accessible by one or more additional threads. Additionally, or alternatively, each store operation corresponding to a pointer may be interrogated at the store barrier by executing a pointer interrogation operation to determine whether the store operation includes storing, in a shared memory region, a pointer that includes a reference to a location of a shared object in a private memory region. When a thread executes a store operation that results in a shared object that is accessible by one or more additional threads, the thread may be disqualified from eligibility for execution of the sweeping TLGC process. Additionally, or alternatively, a thread may be eligible for the sweeping TLGC process when the objects resulting from the store operations executed by the thread are exclusive of any shared object that is accessible by one or more additional threads.

In one example, executing a thread at block 502 may include executing a plurality of load operations. The plurality of load operations may include loading a plurality of pointers. Additionally, or alternatively, the plurality of load operations may include loading a plurality of objects from a private memory region. At block 506, the determination as to whether or not the set of objects is exclusive of any shared objects that are accessible by one or more additional threads may be performed at least in part at a load barrier when loading a respective pointer and/or when loading a respective object. Each load operation corresponding to a pointer may be interrogated at the load barrier by executing a pointer interrogation operation to determine whether the load operation includes loading, from a shared memory region, a pointer that includes a reference to a location of a shared object in a private memory region. Additionally, or alternatively, each load operation corresponding to an object may be interrogated at the load barrier by executing an object interrogation operation to determine whether or not the load operation includes loading, from a private memory region, a shared object that is accessible by one or more additional threads. When a thread executes a load operation that results in a shared object that is accessible by one or more additional threads, the thread may be disqualified from eligibility for execution of the sweeping TLGC process. Additionally, or alternatively, a thread may be eligible for the sweeping TLGC process when the objects resulting from the load operations executed by the thread are exclusive of any shared object that is accessible by one or more additional threads.

At block 508, the operations 500 may include executing the sweeping TLGC process. The sweeping TLGC process may be executed upon or after detecting termination of the thread at block 504. The sweeping TLGC process may include reclaiming the private memory region. In one example, reclaiming the private memory region may include releasing, from the private memory region, a set of memory blocks allocated for the set of objects. Additionally, or alternatively, reclaiming the private memory region may include marking the set of memory blocks as available for reuse. Additionally, or alternatively, reclaiming the private memory region may include allocating the set of memory blocks to an available memory pool. In one example, the sweeping TLGC process may be executed asynchronously from termination of the thread. In one example, the sweeping TLGC process may be executed when a threshold level of memory blocks may be available to reclaim by executing the TLGC process. Additionally, or alternatively, the sweeping TLGC process may be postponed until the threshold level of memory blocks become available.

At block 510, the operations 500 may include executing the selective GC process. The selective GC process may include selectively reclaiming from the private memory region a subset of memory blocks allocated for a subset of private objects, of the set of objects, that are inaccessible from any thread. In one example, reclaiming the subset of memory blocks from the private memory region may include releasing the subset of memory blocks from the private memory region. Additionally, or alternatively, reclaiming the subset of memory blocks from the private memory region may include marking the subset of memory blocks as available for reuse. Additionally, or alternatively, reclaiming the subset of memory blocks from the private memory region may include allocating the subset of memory blocks to an available memory pool. The selective GC process may be executed upon or after detecting termination of the thread at block 504. In one example, the selective GC process may be executed asynchronously from termination of the thread. In one example, the selective GC process may be executed when a threshold level of memory blocks may be available to reclaim by executing the selective GC process. Additionally, or alternatively, the selective GC process may be postponed until the threshold level of memory blocks become available.

In one example, the operations 500 may include executing a first thread, including storing a first set of objects to a first private memory region. The operations 500 may also include detecting termination of the first thread, and executing a first GC process. In one example, the first GC process may include a sweeping TLGC process. The sweeping TLGC process may be selected for execution responsive to determining that the first set of objects is exclusive of any shared objects accessible by one or more additional threads. Execution of the sweeping TLGC process may include reclaiming the first private memory region. Additionally, or alternatively, the operations may include executing a second thread, including storing a second set of objects to a second private memory region. The operations 500 may also include detecting termination of the second thread and executing a second GC process. In one example, the second GC process may include a selective GC process. The selective GC process may be selected for execution responsive to determining that the second set of objects includes at least one shared object that is accessible by one or more additional threads. Execution of the selective GC process may include selectively reclaiming from the second private memory region a subset of memory blocks allocated for a subset of private objects, of the second set of objects, that are inaccessible from any thread. In contrast with the selective GC process, the sweeping GC process may include reclaiming an entirety of the first private memory region without selectively reclaiming any subset of the first private memory region.

In one example, executing the first thread may include storing a first set of pointers that respectively include a reference to the first private memory region. Execution of the sweeping TLGC process may be responsive to determining that the first set of pointers is exclusive of any pointers referencing a shared object that is accessible by one or more additional threads. Additionally, or alternatively, executing the first thread may include loading a first set of pointers. Execution of the sweeping TLGC process may be responsive to determining that the first set of pointers is exclusive of any pointer that includes a reference to a shared object stored in a private memory region.

In one example, executing the second thread may include storing a second pointer that includes a reference to a shared object in the second private memory region. The selective GC process may be selected and executed responsive to determining that the second pointer includes the reference to the shared object in the second private memory region. Additionally, or alternatively, executing the second thread may include loading a third pointer that includes a reference to a shared object in a third private memory region. The selective GC process may be selected and executed responsive to loading the third pointer that includes the reference to the shared object in the third private memory region.

The selective GC process may include a thread-local selective GC process or a global selective GC process. The thread-local selective GC process may include identifying and reclaiming memory allocated for objects in the second private memory region that are unreachable from any thread. The global selective GC process may include identifying and reclaiming from a plurality of private memory regions, including the second private memory region, memory allocated for objects that are unreachable from any thread.

4.2. Disqualifying Threads from Sweeping TLGC

Referring to FIG. 5B, the operations 500 pertaining to disqualifying threads from sweeping TLGC are further described. As shown in FIG. 5B, the operations 500 may include, at block 520, executing a first virtual thread. Executing the first virtual thread may include storing a first set of one or more objects in a first private memory region and storing a pointer in a shared memory region. The first private memory region may include at least a portion of a thread area as described with reference to FIG. 3. The first private memory region may include a set of memory blocks allocated for the first virtual thread. Additionally, or alternatively, the first private memory region may include a set of thread structures and/or a virtual machine stack associated with the first virtual thread. The shared memory region may include at least a portion of the shared area as described with reference to FIG. 3. In one example, the shared memory region may include at least a portion of a heap corresponding to the shared area.

At block 522, the operations 500 may include determining whether the pointer includes a reference to a location of a shared object in the first private memory region. Additionally, or alternatively, the operations 500 at block 522 may include determining whether the first set of one or more objects stored in the first private memory region includes a shared object. If the reference of pointer points to a shared object in the first private memory region, then the shared object may be accessible by other virtual threads via the pointer stored in the shared memory region. When the pointer stored in the shared memory region at block 520 includes a reference to a location of a shared object in the first private memory region, the shared object may be one of the first set of one or more objects stored in the first private memory region at block 520. In one example, the pointer may be accessed by a second virtual thread as described with reference to FIG. 5C. When the pointer includes a reference to a location of the shared object in the first private memory region, the operations may proceed to block 524. When the pointer does not include a reference to a location of the shared object in the first private memory region, the operations may proceed to block 532.

At block 524, the operations 500 may include designating the first virtual thread as disqualified from eligibility for execution of a sweeping TLGC process. In one example, the system may designate the first virtual thread as disqualified from eligibility for execution of the sweeping TLGC process based on a thread-specific flag. The flag may be associated with the first virtual thread or a thread ID corresponding to the first virtual thread. Additionally, or alternatively, the system may allocate a data structure to the first virtual thread to track whether or not the first virtual thread is disqualified from eligibility for execution of the sweeping TLGC process. The system may update the data structure allocated to the first virtual thread to indicate that the first virtual thread is disqualified.

At block 526, the operations 500 may include augmenting the pointer to indicate that the pointer includes the reference to the location of the shared object in the first private memory region. In one example, the pointer may include a pointer attribute bitset, and augmenting the pointer may include augmenting the pointer attribute bitset to indicate that the pointer includes the reference to the location of the first shared object in the first private memory region.

In one example, augmenting the pointer may be configured to trigger an error in response to an additional virtual thread loading the pointer. The error may trigger execution of an error-handling operation on the pointer that may be utilized to determine that the pointer has been augmented as described with reference to FIG. 5C. In one example, augmenting the pointer may include repositioning one or more bitsets of the pointer. Repositioning at least the portion of the metadata bitset may trigger an error in response to an additional virtual thread loading the pointer.

In one example, the pointer may include a resource location bitset and a metadata bitset, and augmenting the pointer may include repositioning at least a portion of the metadata bitset relative to the resource location bitset. The resource location bitset may include a set of one or more resource location bits representing the location of the shared object. The metadata bitset may include a set of one or more metadata bits representing information pertaining to the pointer and/or the shared object. The repositioning of at least the portion of the metadata bitset relative to the resource location bitset may include at least one of the following: a bit-shifting operation, a bit-reversal operation, or a bit-swapping operation. The bit-shifting operation, the bit-reversal operation, and/or the bit-swapping operation may be executed upon the metadata bitset or the resource location bitset.

In one example, the determination at block 522, as to whether or not the pointer includes the reference to the location of the shared object in the first private memory region, may be performed at a store barrier. In one example, executing the first virtual thread at block 520 may include executing a store operation for storing the pointer in the shared memory region. Additionally, the operations at block 522 may include intercepting the store operation at a store barrier, triggering, at the store barrier, execution of a pointer interrogation operation, and determining that the pointer includes the reference to the location of the first shared object in the first private memory region at least by executing the pointer interrogation operation. Additionally, or alternatively, designating the first virtual thread as disqualified from eligibility for execution of a sweeping TLGC process may include executing a disqualification operation. The disqualification operation may be triggered and executed at the store barrier. The first virtual thread may be designated as disqualified from eligibility for the sweeping TLGC process at least by executing the disqualification operation. Additionally, or alternatively, augmenting the pointer at block 526 may include executing a pointer augmentation operation. The pointer augmentation operation may be triggered and executed at the store barrier. The pointer augmentation operation may be executed responsive to determining that the pointer includes the reference to the location of the first shared object in the first private memory region. The pointer may be augmented at least by executing the pointer augmentation operation.

At block 528, the operations 500 may include exiting the first virtual thread. The first virtual thread may exit at the end of its designated set of tasks. Additionally, or alternatively, the first virtual thread may be a part of a larger process, and the first virtual thread may exit when the larger process exits. Additionally, or alternatively, the first virtual thread may exit as a result of an explicit termination instruction, a signal, or an interrupt. Additionally, or alternatively, the first virtual thread may exit as a result of an exception, an error, or a timeout.

At block 530, the operations 500 may include executing a selective GC process with respect to the first virtual thread. The selective GC process may be executed upon the first virtual thread having exited, such as immediately after the first virtual thread exits or after a period of time has elapsed. The selective GC process may be triggered based at least in part on the first virtual thread having exited. Additionally, or alternatively, the system may initiate the selective GC process when or after the first virtual thread exits. In one example, the system may execute the selective GC process in response to determining that the first virtual thread is disqualified from eligibility for execution of a sweeping TLGC process. In one example, the system may check a thread-specific flag or a data structure associated with the first virtual thread to determine whether or not the first virtual thread has been disqualified from eligibility for execution of the sweeping TLGC process.

The exiting of the first virtual thread may be detected by a thread status checking algorithm that queries the status of the first virtual thread. In one example, in Java, the "Thread.isAlive( )" operator may be utilized to check whether the first virtual thread is still executing. Additionally, or alternatively, the first virtual thread can register a callback or signal that gets triggered when the first virtual thread exits. Additionally, or alternatively, a thread variable may indicate whether the first virtual thread is active or exited. An event handler may monitor the thread variable for one or more threads to determine threads that are active and/or to determine when the first virtual thread is exited. Additionally, or alternatively, an exception handling mechanism may detect thread exit events.

In one example, the selective GC process may include a global selective GC process. The global selective GC process may be executed with respect to a plurality of virtual threads after exiting the plurality of virtual threads. In one example, the selective GC process may be executed with respect to the first virtual thread and one or more additional threads. The one or more additional threads may include the second virtual thread described with reference to FIG. 5C. The global selective GC process may include identifying and reclaiming from a plurality of memory regions corresponding to the plurality of virtual threads, memory allocated for objects that are unreachable from any thread. Additionally, or alternatively, the selective GC process may include a thread-local selective GC process. The thread-local selective GC process may be executed with respect to the first virtual thread. The thread-local selective GC process may include identifying and reclaiming memory allocated for objects in the first private memory region that are unreachable from any thread.

At block 532, the operations 500 may include exiting the first virtual thread. As described with reference to block 528, the first virtual thread may exit upon the occurrence of one or more of the following: at the end of its designated set of tasks; when a larger process exits; as a result of an explicit termination instruction, a signal, or an interrupt; as a result of an exception, an error, or a timeout.

At block 534, the operations 500 may include executing a sweeping TLGC process with respect to the first virtual thread. The sweeping TLGC process may include reclaiming the first private memory region. The sweeping TLGC process may be executed upon the first virtual thread having exited, such as immediately after the first virtual thread exits or after a period of time has elapsed. The sweeping TLGC process may be triggered based at least in part on the first virtual thread having exited. Additionally, or alternatively, the system may initiate the sweeping TLGC process when or after the first virtual thread exits. In one example, the system may execute the sweeping TLGC process in response to determining that the first virtual thread is eligible for execution of the sweeping TLGC process. In one example, the system may check a thread-specific flag or a data structure associated with the first virtual thread to determine whether or not the first virtual thread is eligible for execution of the sweeping TLGC process.

As described with reference to block 530, the exiting of the first virtual thread may be detected by one or more of the following: a thread status checking algorithm; a callback or signal that gets triggered when the first virtual thread exits; a thread variable that indicates whether the first virtual thread is active or exited; an event handler that keeps track of threads that are active and/or exited; or an exception handling mechanism that detects thread termination events.

Referring to FIG. 5C, the operations 500 pertaining to disqualifying threads from sweeping TLGC are further described. As shown in FIG. 5B, the operations 500 may include, at block 540, executing a second virtual thread. Executing the second virtual thread may include loading a pointer. The pointer loaded at block 540 may have been stored by a virtual thread other than the second virtual thread. In one example, the pointer loaded at block 540 may be the pointer stored when executing the first virtual thread, for example, at block 520. Additionally, executing the second virtual thread may include storing one or more objects to a second private memory region. The second private memory region may be allocated for the second virtual thread. The second private memory region may be a different private memory region from the first private memory region described with reference to FIG. 5B. The second private memory region may include at least a portion of a thread area as described with reference to FIG. 3. The second private memory region may include a set of memory blocks allocated for the second virtual thread. Additionally, or alternatively, the second private memory region may include a set of thread structures and/or a virtual machine stack associated with the second virtual thread.

At block 542, the operations 500 may include determining whether the pointer loaded by the second virtual thread at block 540 has been augmented to indicate that the pointer includes a reference to a location of a shared object in a private memory region. In one example, the pointer loaded by the second virtual thread at block 540 may include a reference to a location in the first private memory region allocated for the first virtual thread described with reference to FIG. 5B. Additionally, or alternatively, the pointer may include a reference to a location in another private memory region allocated for another virtual thread. Additionally, or alternatively, the pointer loaded by the second virtual thread at block 540 may not include a reference to a location of a shared object in a private memory region. In one example, the pointer loaded by the second virtual thread at block 540 may include a reference to a location of a private object in the second private memory region or a reference to a location of a shared object in a shared memory region. When the pointer has been augmented to indicate that the pointer includes a reference to a location of a shared object in a private memory region, the operations may proceed to block 544. When the pointer has not been augmented to indicate that the pointer includes a reference to a location of a shared object in a private memory region, the operations may proceed to block 550.

In one example, the pointer may have been augmented in a manner that is configured to trigger an error in response to a virtual thread loading the pointer. In one example, the operations 500 may include determining the error responsive to the second virtual thread loading the pointer. Additionally, the operations 500 may include executing an error-handling operation on the pointer. The error-handling operation may be triggered in response to the error. In one example, the error-handling operation may include determining that the pointer has been augmented to indicate that the pointer includes a reference to a location of a shared object in a private memory region. For example, the pointer loaded by the second virtual thread may have been augmented to include a reference to the location of the first shared object in the first private memory region as described with reference to FIG. 5B.

In one example, executing the error-handling operation may include resolving the error associated with the pointer. Resolving the error may include determining the location of the first shared object in the first private memory region. In one example, the operations 500 may include further executing the second virtual thread. Further executing the second virtual thread may include loading the first shared object from the first private memory region in response to resolving the error and/or in response to determining the location of the first shared object in the first private memory region.

In one example, the determination at block 542, as to whether or not the pointer loaded by the second virtual thread has been augmented, may be performed at a load barrier. In one example, executing the second virtual thread at block 540 may include executing a load operation for loading the pointer from the shared memory region. In addition, the operations at block 542 may include intercepting the load operation at a load barrier, triggering, at the load barrier, execution of a pointer interrogation operation and determining that the pointer includes the reference to the location of the first shared object in the first private memory region at least by executing the pointer interrogation operation. Additionally, or alternatively, the operations at block 542 may include determining that the pointer has been augmented to indicate that the pointer includes the reference to the location of the first shared object in the first private memory region at least by executing the pointer interrogation operation. Additionally, or alternatively, designating the second virtual thread as disqualified from eligibility for execution of a sweeping TLGC process may include executing a disqualification operation. The disqualification operation may be triggered and executed at the load barrier. The second virtual thread may be designated as disqualified from eligibility for the sweeping TLGC process at least by executing the disqualification operation.

At block 544, the operations 500 may include designating the second virtual thread as disqualified from eligibility for execution of the sweeping TLGC process. In one example, the system may designate the second virtual thread as disqualified from eligibility for execution of the sweeping TLGC process based on a thread-specific flag. The flag may be associated with the second virtual thread or a thread ID corresponding to the second virtual thread. Additionally, or alternatively, the system may allocate a data structure to the second virtual thread to track whether the second virtual thread is disqualified from eligibility for execution of the sweeping TLGC process. The system may update the data structure allocated to the second virtual thread to indicate that the second virtual thread is disqualified.

At block 546, the operations 500 may include exiting the second virtual thread. The second virtual thread may exit at the end of its designated set of tasks. Additionally, or alternatively, the second virtual thread may be a part of a larger process and the second virtual thread may exit when the larger process exits. Additionally, or alternatively, the second virtual thread may exit as a result of an explicit termination instruction, a signal, or an interrupt. Additionally, or alternatively, the second virtual thread may exit as a result of an exception, an error, or a timeout.

At block 548, the operations 500 may include executing a selective GC process with respect to the second virtual thread. The selective GC process may be executed upon the second virtual thread having exited, such as immediately after the second virtual thread exits or after a period of time has elapsed. The selective GC process may be triggered based at least in part on the second virtual thread having exited. Additionally, or alternatively, the system may initiate the selective GC process when or after the second virtual thread exits. In one example, the system may execute the selective GC process in response to determining that the second virtual thread is disqualified from eligibility for execution of a sweeping TLGC process. In one example, the system may check a thread-specific flag or a data structure associated with the second virtual thread to determine whether the second virtual thread has been disqualified from eligibility for execution of the sweeping TLGC process.

The exiting of the second virtual thread may be detected by a thread status checking algorithm that queries the status of the second virtual thread. In one example, in Java, the "Thread.isAlive( )" operator may be utilized to check whether the second virtual thread is still executing. Additionally, or alternatively, the second virtual thread can register a callback or signal that gets triggered when the second virtual thread exits. Additionally, or alternatively, a thread variable may indicate whether the second virtual thread is active or exited. An event handler may monitor the thread variable for one or more threads to determine threads that are active and/or to determine when the second virtual thread is exited. Additionally, or alternatively, an exception handling mechanism may detect thread exit events.

In one example, the selective GC process may include a global selective GC process. The global selective GC process may be executed with respect to a plurality of virtual threads after exiting the plurality of virtual threads. In one example, the selective GC process may be executed with respect to the first virtual thread and the second virtual thread. The global selective GC process may include identifying and reclaiming from a plurality of memory regions corresponding to the plurality of virtual threads, memory allocated for objects that are unreachable from any thread. Additionally, or alternatively, the selective GC process may include a thread-local selective GC process. The thread-local selective GC process may be executed with respect to the second virtual thread. The thread-local selective GC process may include identifying and reclaiming memory allocated for objects in the second private memory region that are unreachable from any thread.

At block 550, the operations 500 may include exiting the second virtual thread. As described with reference to block 546, the second virtual thread may exit upon the occurrence of one or more of the following: at the end of its designated set of tasks; when a larger process exits; as a result of an explicit termination instruction, a signal, or an interrupt; as a result of an exception, an error, or a timeout.

At block 552, the operations 500 may include executing a sweeping TLGC process with respect to the second virtual thread. The sweeping TLGC process may include reclaiming the second private memory region. The sweeping TLGC process may be executed upon the second virtual thread having exited, such as immediately after the second virtual thread exits or after a period of time has elapsed. The sweeping TLGC process may be triggered based at least in part on the second virtual thread having exited. Additionally, or alternatively, the system may initiate the sweeping TLGC process when or after the second virtual thread exits. In one example, the system may execute the sweeping TLGC process in response to determining that the second virtual thread is eligible for execution of the sweeping TLGC process. In one example, the system may check a thread-specific flag or a data structure associated with the second virtual thread to determine whether the second virtual thread is eligible for execution of the sweeping TLGC process.

As described with reference to block 548, the exiting of the second virtual thread may be detected by one or more of the following: a thread status checking algorithm; a callback or signal that gets triggered when the second virtual thread exits; a thread variable that indicates whether the second virtual thread is active or exited; an event handler that keeps track of threads that are active and/or exited; or an exception handling mechanism that detects thread termination events.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
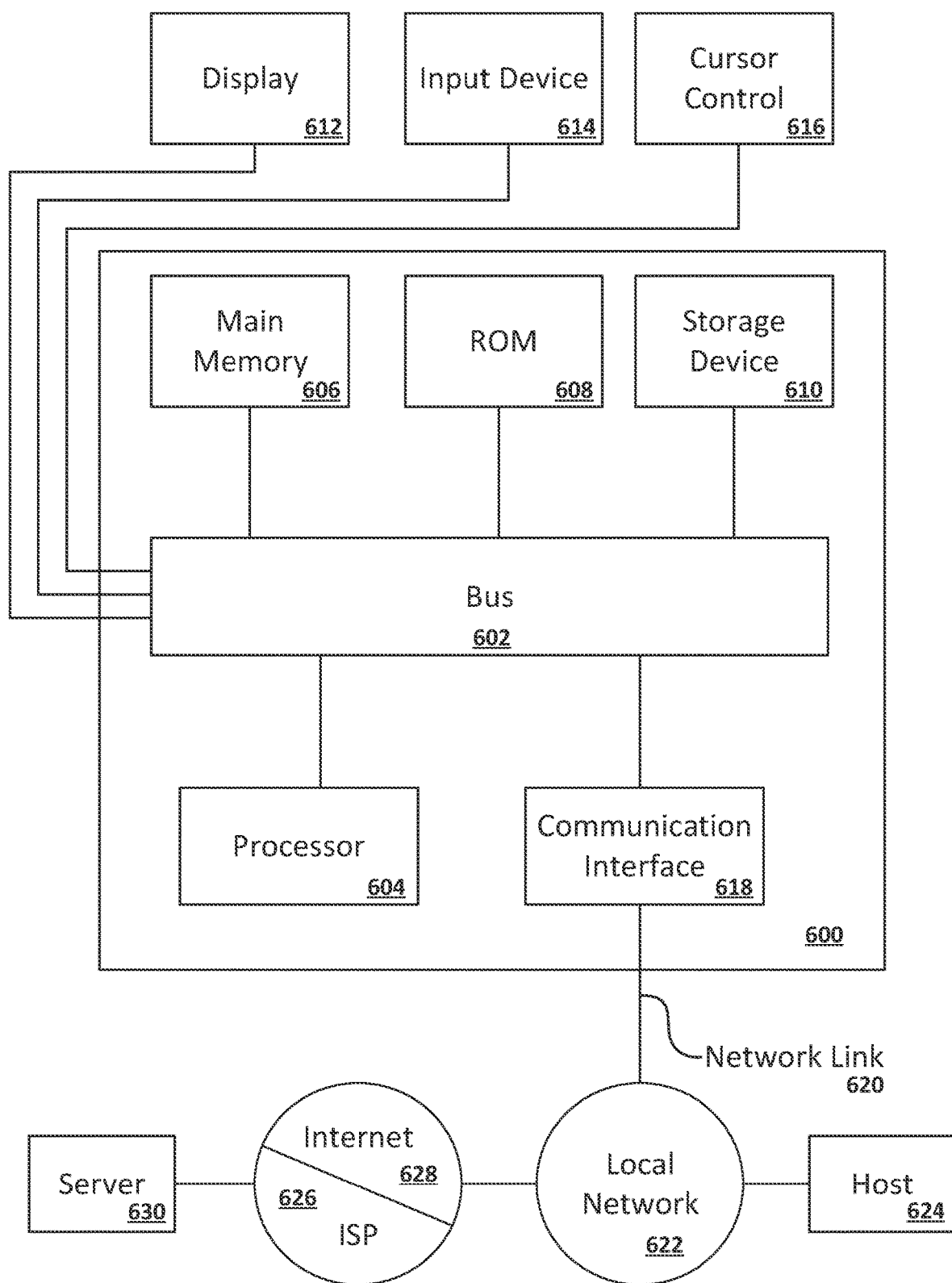
FIG. 6 shows a block diagram that illustrates a computer system in accordance with one or more embodiments.

For example, FIG. 6 is a block diagram that illustrates a computer system 600 that may be utilized to implement at least one embodiment of the present disclosure. Computer system 600 may include a bus 602 or other communication mechanism for communicating information, and a hardware processor 604 coupled with bus 602 for processing information. Hardware processor 604 may be, for example, a general-purpose microprocessor.

Computer system 600 also may include a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 may further include a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic that, in combination with the computer system, causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media may include, for example, optical or magnetic disks, such as storage device 610. Volatile media may include dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media may include coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606. Processor 604 retrieves the data from main memory 606 and executes the instructions. The instructions received from main memory 606 may optionally be stored on storage device 610 either before or after execution by processor 604.

Computer system 600 also may include a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic, or optical signals that carry digital data streams. Example forms of transmission media include the signals through the various networks, the signals through network link 620, and the signals through communication interface 618.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions that, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of patent protection, and what is intended by the applicants to be the scope of patent protection, is the literal and equivalent scope of the set of claims that issue from this application, in the specific form that such claims issue, including any subsequent correction.

What is claimed is:

1. One or more non-transitory computer-readable media storing instructions that, when executed by one or more hardware processors, cause performance of operations comprising:
    executing a first virtual thread, wherein executing the first virtual thread comprises:
        storing a first shared object in a first private memory region,
        storing a pointer in a shared memory region, and
        determining that the pointer comprises a reference to a location of the first shared object in the first private memory region;
    responsive to determining that the pointer comprises the reference to the location of the first shared object in the first private memory region:
        designating the first virtual thread as disqualified from eligibility for execution of a sweeping thread-local garbage collection process; and
        augmenting the pointer to indicate that the pointer comprises the reference to the location of the first shared object in the first private memory region.

2. The one or more non-transitory computer-readable media of claim 1, wherein the operations further comprise:
    executing a second virtual thread, wherein executing the second virtual thread comprises:
        loading the pointer, and
        determining that the pointer has been augmented to indicate that the pointer comprises the reference to the location of the first shared object in the first private memory region;
    responsive to determining that the pointer has been augmented to indicate that the pointer comprises the reference to the location of the first shared object in the first private memory region:
        designating the second virtual thread as disqualified from eligibility for execution of the sweeping thread-local garbage collection process.

3. The one or more non-transitory computer-readable media of claim 2,
    wherein augmenting the pointer is configured to trigger an error in response to an additional virtual thread loading the pointer; and
    wherein the operations further comprise:
        determining the error responsive to the second virtual thread loading the pointer, and responsive to determining the error, executing an error-handling operation on the pointer, wherein executing the error-handling operation comprises:
　　determining that the pointer has been augmented to indicate that the pointer comprises the reference to the location of the first shared object in the first private memory region.

4. The one or more non-transitory computer-readable media of claim 3,
　wherein executing the error-handling operation further comprises:
　　resolving the error associated with the pointer, wherein resolving the error comprises determining the location of the first shared object in the first private memory region;
　wherein executing the second virtual thread further comprises:
　　responsive to determining the location of the first shared object in the first private memory region, and loading the first shared object from the first private memory region.

5. The one or more non-transitory computer-readable media of claim 2, wherein the operations further comprise:
　exiting the first virtual thread;
　exiting the second virtual thread; and
　executing a global selective garbage collection process with respect to the first virtual thread and the second virtual thread,
　　wherein the global selective garbage collection process comprises identifying and reclaiming memory allocated for objects that are unreachable from any thread.

6. The one or more non-transitory computer-readable media of claim 1,
　wherein the pointer comprises a resource location bitset and a metadata bitset,
　　wherein the resource location bitset comprises a set of one or more resource location bits representing the location of the first shared object,
　　wherein the metadata bitset comprises a set of one or more metadata bits representing information pertaining to at least one of: the pointer, or the first shared object,
　wherein augmenting the pointer comprises:
　　repositioning at least a portion of the metadata bitset relative to the resource location bitset, wherein repositioning at least the portion of the metadata bitset is configured to trigger an error in response to an additional virtual thread loading the pointer.

7. The one or more non-transitory computer-readable media of claim 6, wherein repositioning at least the portion of the metadata bitset relative to the resource location bitset comprises at least one of:
　executing a bit-shifting operation upon the metadata bitset or the resource location bitset;
　executing a bit-reversal operation upon the metadata bitset or the resource location bitset;
　executing a bit-swapping operation upon the metadata bitset or the resource location bitset; or
　executing a bit-rotation operation upon the metadata bitset or the resource location bitset.

8. The one or more non-transitory computer-readable media of claim 1, wherein determining that the pointer comprises the reference to the location of the first shared object in the first private memory region comprises:
　executing a store operation for storing the pointer in the shared memory region;
　intercepting the store operation at a store barrier;
　triggering, at the store barrier, execution of a pointer interrogation operation;
　determining that the pointer comprises the reference to the location of the first shared object in the first private memory region at least by executing the pointer interrogation operation.

9. The one or more non-transitory computer-readable media of claim 8, wherein augmenting the pointer comprises:
　responsive to determining that the pointer comprises the reference to the location of the first shared object in the first private memory region, triggering at the store barrier, execution of a pointer augmentation operation;
　augmenting the pointer, at least by executing the pointer augmentation operation, to indicate that the pointer comprises the reference to the location of the first shared object in the first private memory region.

10. The one or more non-transitory computer-readable media of claim 8, wherein designating the first virtual thread as disqualified from eligibility for the sweeping thread-local garbage collection process comprises:
　responsive to determining that the pointer comprises the reference to the location of the first shared object in the first private memory region, triggering at the store barrier, execution of a disqualification operation;
　designating the first virtual thread as disqualified from eligibility for the sweeping thread-local garbage collection process at least by executing the disqualification operation.

11. The one or more non-transitory computer-readable media of claim 1,
　wherein the pointer comprises a pointer attribute bitset,
　wherein augmenting the pointer comprises:
　　augmenting the pointer attribute bitset to indicate that the pointer comprises the reference to the location of the first shared object in the first private memory region.

12. The one or more non-transitory computer-readable media of claim 1, wherein the operations further comprise:
　exiting the first virtual thread; and
　executing a thread-local selective garbage collection process with respect to the first virtual thread,
　　wherein the thread-local selective garbage collection process comprises identifying and reclaiming memory allocated for objects in the first private memory region that are unreachable from any thread.

13. The one or more non-transitory computer-readable media of claim 1, wherein the operations further comprise:
　executing a second virtual thread, wherein executing the second virtual thread comprises:
　　executing a plurality of store operations comprising storing a plurality of objects in a second private memory region allocated for the second virtual thread,
　　wherein the plurality of store operations are exclusive of storing in the second private memory region, any shared objects accessible by one or more additional virtual threads;
　exiting the second virtual thread; and
　executing the sweeping thread-local garbage collection process with respect to the second virtual thread,
　　wherein the sweeping thread-local garbage collection process comprises at least one of:
　　　releasing, from the second private memory region, a first set of memory blocks allocated for the plurality of objects;

marking the first set of memory blocks as available for reuse; or
allocating the first set of memory blocks to an available memory pool.

14. The one or more non-transitory computer-readable media of claim 1, wherein the operations further comprise:
executing a second virtual thread, wherein executing the second virtual thread comprises:
executing a plurality of load operations comprising loading a plurality of pointers respectively comprising a reference to a second private memory region,
wherein the plurality of load operations is exclusive of loading any pointers from a shared memory region comprising a reference to a third private memory region;
exiting the second virtual thread; and
executing the sweeping thread-local garbage collection process with respect to the second virtual thread,
wherein the sweeping thread-local garbage collection process further comprises at least one of:
releasing, from the second private memory region, a second set of memory blocks allocated for the plurality of pointers;
marking the second set of memory blocks as available for reuse; or
allocating the second set of memory blocks to an available memory pool.

15. A method, comprising:
executing a first virtual thread, wherein executing the first virtual thread comprises:
storing a first shared object in a first private memory region,
storing a pointer in a shared memory region, and
determining that the pointer comprises a reference to a location of the first shared object in the first private memory region;
responsive to determining that the pointer comprises the reference to the location of the first shared object in the first private memory region:
designating the first virtual thread as disqualified from eligibility for execution of a sweeping thread-local garbage collection process; and
augmenting the pointer to indicate that the pointer comprises the reference to the location of the first shared object in the first private memory region;
wherein the method is performed by at least one device including a hardware processor.

16. The method of claim 15, further comprising:
executing a second virtual thread, wherein executing the second virtual thread comprises:
loading the pointer, and
determining that the pointer has been augmented to indicate that the pointer comprises the reference to the location of the first shared object in the first private memory region;
responsive to determining that the pointer has been augmented to indicate that the pointer comprises the reference to the location of the first shared object in the first private memory region:
designating the second virtual thread as disqualified from eligibility for execution of the sweeping thread-local garbage collection process.

17. The method of claim 16,
wherein augmenting the pointer is configured to trigger an error in response to an additional virtual thread loading the pointer; and
wherein the method further comprises:
determining the error responsive to the second virtual thread loading the pointer, and
responsive to determining the error, executing an error-handling operation on the pointer, wherein executing the error-handling operation comprises:
determining that the pointer has been augmented to indicate that the pointer comprises the reference to the location of the first shared object in the first private memory region.

18. The method of claim 15,
wherein the pointer comprises a resource location bitset and a metadata bitset,
wherein the resource location bitset comprises a set of one or more resource location bits representing the location of the first shared object,
wherein the metadata bitset comprises a set of one or more metadata bits representing information pertaining to at least one of: the pointer, or the first shared object,
wherein augmenting the pointer comprises:
repositioning at least a portion of the metadata bitset relative to the resource location bitset, wherein repositioning at least the portion of the metadata bitset is configured to trigger an error in response to an additional virtual thread loading the pointer.

19. The method of claim 15, wherein determining that the pointer comprises the reference to the location of the first shared object in the first private memory region comprises:
executing a store operation for storing the pointer in the shared memory region;
intercepting the store operation at a store barrier;
triggering, at the store barrier, execution of a pointer interrogation operation;
determining that the pointer comprises the reference to the location of the first shared object in the first private memory region at least by executing the pointer interrogation operation.

20. A system, comprising:
at least one hardware processor;
wherein the system is configured to execute operations, using the at least one hardware processor, the operations comprising:
executing a first virtual thread, wherein executing the first virtual thread comprises:
storing a first shared object in a first private memory region,
storing a pointer in a shared memory region, and
determining that the pointer comprises a reference to a location of the first shared object in the first private memory region;
responsive to determining that the pointer comprises the reference to the location of the first shared object in the first private memory region:
designating the first virtual thread as disqualified from eligibility for execution of a sweeping thread-local garbage collection process; and
augmenting the pointer to indicate that the pointer comprises the reference to the location of the first shared object in the first private memory region.

* * * * *